(12) United States Patent
Shin et al.

(10) Patent No.: US 11,562,741 B2
(45) Date of Patent: Jan. 24, 2023

(54) ELECTRONIC DEVICE AND CONTROLLING METHOD USING NON-SPEECH AUDIO SIGNAL IN THE ELECTRONIC DEVICE

(71) Applicant: Samsung Electronics Co., Ltd., Suwon-si (KR)

(72) Inventors: Hoseon Shin, Suwon-si (KR); Chulmin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 17/003,101

(22) Filed: Aug. 26, 2020

(65) Prior Publication Data

US 2021/0097996 A1 Apr. 1, 2021

(30) Foreign Application Priority Data

Sep. 30, 2019 (KR) ........................ 10-2019-0120567

(51) Int. Cl.
*G10L 15/22* (2006.01)
*G10L 21/0232* (2013.01)
(Continued)

(52) U.S. Cl.
CPC .......... *G10L 15/22* (2013.01); *G10L 21/0232* (2013.01); *G10L 25/84* (2013.01);
(Continued)

(58) Field of Classification Search
CPC ..... G10L 15/22; G10L 21/0232; G10L 25/84; G10L 15/30; G10L 2015/223;
(Continued)

(56) References Cited

U.S. PATENT DOCUMENTS 9,087,520 B1 7/2015 Salvador
9,484,030 B1 * 11/2016 Meaney ................. H04R 3/005
(Continued)

FOREIGN PATENT DOCUMENTS

CN 101297355 A * 10/2008 ......... G06F 17/2785
CN 105045385 A 11/2015
(Continued)

OTHER PUBLICATIONS

International Search Report with Written Opinion dated Jan. 15, 2021; International Appln. No. PCT/KR2020/013242.

*Primary Examiner* — Mohammad K Islam
(74) *Attorney, Agent, or Firm* — Jefferson IP Law, LLP

(57) ABSTRACT

An electronic device is provided. The electronic device comprises a speaker, a plurality of microphones, at least one processor operatively connected with the speaker and the plurality of microphones, and a memory operatively connected with the at least one processor, wherein the memory is configured to store instructions which, when executed, cause the at least one processor to perform speech audio processing or non-speech audio processing on audio signals received via the plurality of microphones, upon obtaining a non-speech audio signal based on the speech audio processing or the non-speech audio processing, identify a non-speech audio signal pattern corresponding to the non-speech audio signal, obtain a non-speech audio signal-based first command based on the identified non-speech audio signal pattern, and perform at least one action corresponding to the obtained non-speech audio signal-based first command.

14 Claims, 21 Drawing Sheets

(51) Int. Cl.
  *H04R 1/40* (2006.01)
  *H04R 3/00* (2006.01)
  *G10L 25/84* (2013.01)
  *G10L 15/30* (2013.01)
  *G10L 21/0208* (2013.01)
  *G10L 21/0216* (2013.01)

(52) U.S. Cl.
  CPC ............. *H04R 1/406* (2013.01); *H04R 3/005* (2013.01); *G10L 15/30* (2013.01); *G10L 2015/223* (2013.01); *G10L 2021/02082* (2013.01); *G10L 2021/02166* (2013.01)

(58) Field of Classification Search
  CPC ........... G10L 2021/02082; G10L 2021/02166; H04R 1/406; H04R 3/005
  See application file for complete search history.

(56) References Cited

U.S. PATENT DOCUMENTS

| | | |
|---|---|---|
| 2012/0004913 A1 | 1/2012 | Ju et al. |
| 2012/0166192 A1 | 6/2012 | Yanagihara |
| 2017/0322648 A1 | 11/2017 | Jeong et al. |
| 2018/0039368 A1 | 2/2018 | Choi et al. |

FOREIGN PATENT DOCUMENTS

| | | |
|---|---|---|
| EP | 3 483 721 A1 | 5/2019 |
| JP | 2002-007165 A | 1/2002 |
| KR | 10-2013-0140963 A | 12/2013 |
| KR | 10-1601276 B1 | 3/2016 |

\* cited by examiner

ELECTRONIC DEVICE AND CONTROLLING METHOD USING NON-SPEECH AUDIO SIGNAL IN THE ELECTRONIC DEVICE

CROSS-REFERENCE TO RELATED APPLICATION(S)

This application is based on and claims priority under 35 U.S.C. § 119(a) of a Korean patent application number 10-2019-0120567, filed on Sep. 30, 2019, in the Korean Intellectual Property Office, the disclosure of which is incorporated by reference herein in its entirety.

BACKGROUND

1. Field

The disclosure relates to controlling methods in electronic devices. More particularly, the disclosure relates to performing functions using non-speech audio signals as well as speech audio signals in an electronic device.

2. Description of Related Art

Various electronic devices are recently coming into use, and users may enjoy a diversity of content while carrying their electronic devices. Such an electronic device may connect to an external device via wireless network technology. An artificial intelligence (AI) system which connects to an external device to provide expanded functions is a computer system which implements human level intelligence and in which a machine is self-trained and determines and exhibits a better recognition rate as it is used more.

Artificial intelligence technology may include element techniques, such as machine learning (deep learning) which utilizes algorithms capable of classifying and learning the features of entered data on their own and copying the perception or determination by the human brain using machine learning algorithms.

Such element techniques may include linguistic understanding which recognizes human languages/words, visual understanding which recognizes things as if humans visually do, inference/prediction which determines information and perform logical inference and prediction, knowledge expression which processes human experience information as knowledge data, and motion control which controls robot motions and driver-less vehicles.

Recent splendid growth of information communication and semiconductor technology leads to application of AI-related techniques to various electronic devices and allows such electronic devices to proliferate.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide an electronic device capable of performing functions using non-speech audio signals as well as speech audio signals and a controlling method using non-speech audio signals in the electronic device.

Another aspect of the disclosure is to provide an electronic device capable of more precisely recognizing non-speech audio signal via separate non-speech audio signal processing to raise the recognition rate of speech audio signals and non-speech audio signals and a controlling method using non-speech audio signals in the electronic device.

Another aspect of the disclosure is to provide an electronic device capable of performing various functions using non-speech audio signals as the user registers non-speech audio signals and meanings (information, data, or commands) corresponding to the non-speech audio signals as he desires and a controlling method using non-speech audio signals in the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a speaker, a plurality of microphones, at least one processor operatively connected with the speaker and the plurality of microphones, and a memory operatively connected with the at least one processor, wherein the memory is configured to store instructions which, when executed, cause the at least one processor to perform speech audio processing or non-speech audio processing on an audio signal received via the plurality of microphones, upon obtaining a non-speech audio signal based on the speech audio processing or the non-speech audio processing, identify a non-speech audio signal pattern corresponding to the non-speech audio signal, obtain a non-speech audio signal-based first command based on the identified non-speech audio signal pattern, and perform at least one action corresponding to the obtained non-speech audio signal-based first command.

In accordance with another aspect of the disclosure, a controlling method using a non-speech audio signal in an electronic device is provided. The controlling method includes performing speech audio processing or non-speech audio processing on an audio signal received via a plurality of microphones, obtaining a non-speech audio signal based on the speech audio processing or the non-speech audio processing, identifying a non-speech audio signal pattern corresponding to the non-speech audio signal, obtaining a non-speech audio signal-based first command based on the identified non-speech audio signal pattern, and performing at least one action corresponding to the obtained non-speech audio signal-based first command.

In accordance with another aspect of the disclosure, a non-transitory storage medium storing instructions is provided. The instructions are configured to be executed by at least one circuit to cause the at least one circuit to perform at least one operation comprising performing speech audio processing or non-speech audio processing on audio signals received via a plurality of microphones, obtaining a non-speech audio signal based on the speech audio processing or the non-speech audio processing, identifying a non-speech audio signal pattern corresponding to the non-speech audio signal, obtaining a non-speech audio signal-based first command based on the identified non-speech audio signal pattern, and performing at least one action corresponding to the obtained non-speech audio signal-based first command.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
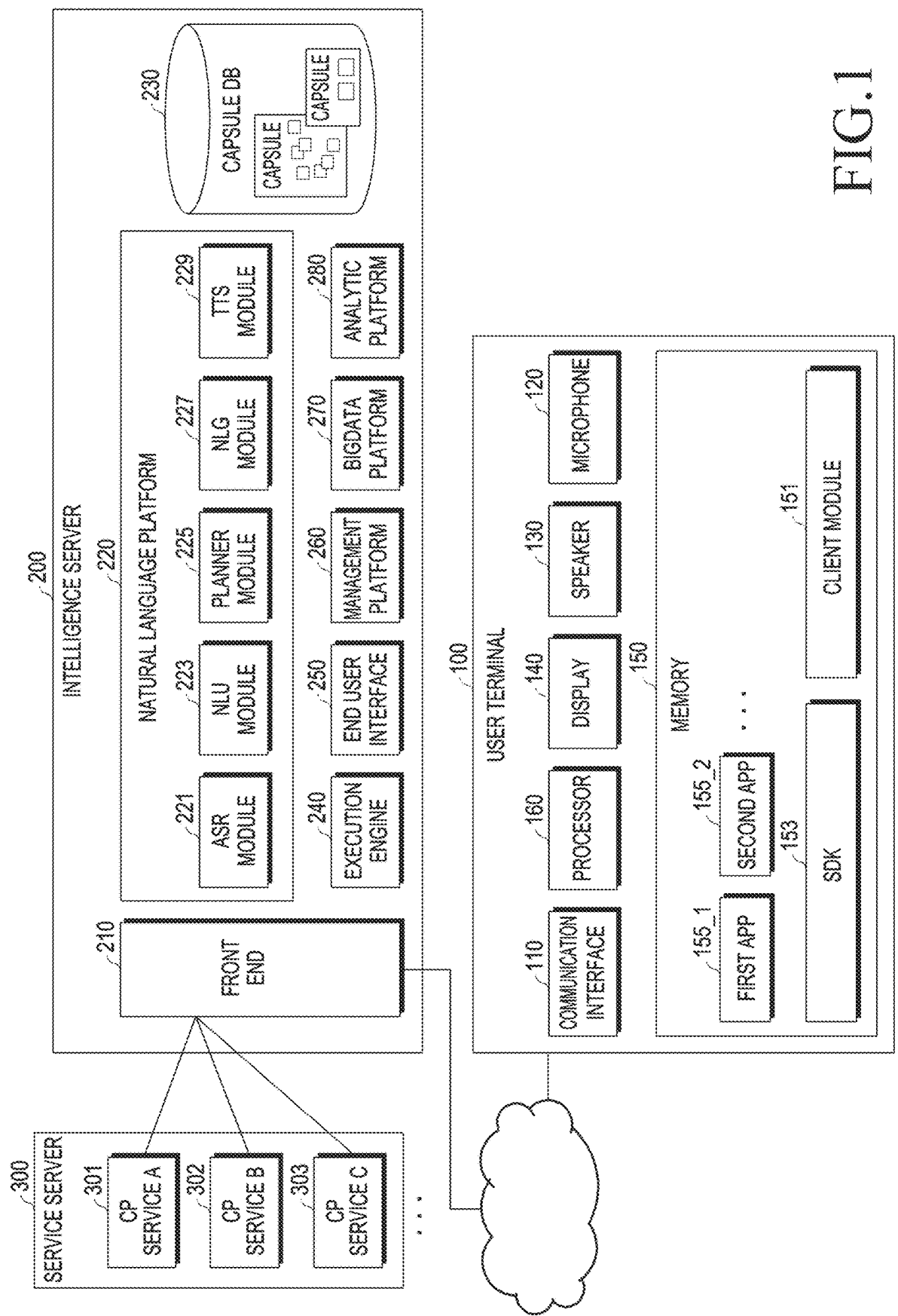
FIG. 1 is a block diagram illustrating an integrated intelligence system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before describing various embodiments of the disclosure, an integrated intelligent system to which an embodiment of the disclosure may apply is described.

According to an embodiment, AI technology is applicable to various electronic devices, such as smartphones, AI speakers, robots, or home appliances and may be used to provide users with various types of speech-based services via natural language processing and speech recognition based on speech signals. For example, an electronic device may receive a speech signal from the user based on AI technology, obtain information (e.g., a command) via speech recognition, and perform a function using the obtained information.

The electronic device may have a plurality of microphones to raise the user speech recognition rate and perform speech recognition primarily on speech audio signals among the audio signals received through the plurality of microphones, and thereby perform a function.

The audio signals that may be received by the electronic device via the plurality of microphones may include various non-speech audio signals as well as speech audio signals. It may also be possible to perform a function using the non-speech audio signals.

Since a non-speech audio signal is not a speech, it may require a recognition scheme other than speech recognition and audio processing suited for non-speech audio signals to raise its recognition rate.

As the speech audio signal is a signal corresponding to, e.g., a word or sentence which may have a specific meaning in the speech frequency band, it may be easy to use even without registering the meaning (information, data, or command) corresponding to the user's speech audio signal in the electronic device. However, the non-speech audio signal, which is a signal that may be produced in various frequency bands, may be difficult to recognize unless assigned a specific meaning. Since there may be non-speech audio signals that may easily be used by the user, it would allow for easier use to register the meaning (information, data, or command) corresponding to the non-speech audio signal in the electronic device.

FIG. 1 is a block diagram illustrating an integrated intelligence system according to an embodiment of the disclosure.

Referring to FIG. 1, according to an embodiment, an integrated intelligence system may include a user terminal 100, an intelligence server 200, and a service server 300.

According to an embodiment, the user terminal 100 may be a terminal device (or electronic device) that may connect to the Internet, e.g., a mobile phone, smartphone, personal digital assistant (PDA), laptop computer, TV, home appliance, wearable device, head-mounted device (HMD), or smart speaker.

According to the shown embodiment, the user terminal 100 may include a communication interface 110, a microphone 120, a speaker 130, a display 140, a memory 150, or a processor 160. The above-enumerated components may be operatively or electrically connected with each other.

According to an embodiment, the communication interface 110 may be configured to connect to, and transmit/receive data to/from, an external device. According to an embodiment, the microphone 120 may receive a sound (e.g., the user's utterance) and convert the sound into an electrical signal. According to an embodiment, the speaker 130 may output the electrical signal as a sound (e.g., speech). According to an embodiment, the display 140 may be configured to display images or videos. According to an embodiment, the display 140 may display a graphic user interface (GUI) of an application program (app) that is executed.

According to an embodiment, the memory 150 may store a client module 151, a software development kit (SDK) 153, and a plurality of apps 155. The client module 151 and the SDK 153 may configure a framework (or solution program) for performing general-purpose functions. The client module 151 or SDK 153 may configure a framework for processing speech input.

According to an embodiment, the plurality of apps 155 stored in the memory 150 may be programs for performing designated functions. According to an embodiment, the plurality of apps 155 may include a first app 155-1 and a second app 155-2. According to an embodiment, each of the plurality of apps may include a plurality of actions for performing the designated function. For example, the apps may include an alarm app, a messaging app, or a scheduler app. According to an embodiment, the plurality of apps 155 may be executed by the processor 160 to sequentially execute at least some of the plurality of operations.

According to an embodiment, the processor 160 may control the overall operation of the user terminal 100. For example, the processor 160 may be electrically connected with the communication interface 110, microphone 120, speaker 130, and display 140 to perform designated operations.

According to an embodiment, the processor 160 may execute the program stored in the memory 150 to perform a designated function. For example, the processor 160 may execute at least one of the client module 151 or the SDK 153 to perform the following operations for processing speech input. The processor 160 may control the operation of the plurality of apps 155 via, e.g., the SDK 153. The following operations described as operations of the client module 151 or SDK 153 may be operations according to the execution of the processor 160.

According to an embodiment, the client module 151 may receive a speech input. For example, the client module 151 may receive a speech signal corresponding to the user's utterance detected via the microphone 120. The client module 151 may transmit the received speech input to the intelligence server 200. The client module 151 may transmit state information about the user terminal 100 along with the received speech input to the intelligence server 200. The state information may be, e.g., app execution state information.

According to an embodiment, the client module 151 may receive a result corresponding to the received speech input. For example, if the intelligence server 200 may produce the result corresponding to the received speech input, the client module 151 may receive the result corresponding to the received speech input. The client module 151 may display the received result on the display 140.

According to an embodiment, the client module 151 may receive a plan corresponding to the received speech input. The client module 151 may display the results of execution of the plurality of operations of the app according to the plan on the display 140. The client module 151 may sequentially display, e.g., the results of execution of the plurality of operations on the display. As another example, the user terminal 100 may display only some results of execution of the plurality of operations (e.g., the result of the last operation) on the display.

According to an embodiment, the client module 151 may receive a request for obtaining information necessary to produce the result corresponding to the speech input from the intelligence server 200. According to an embodiment, the client module 151 may transmit the necessary information to the intelligence server 200 in response to the request.

According to an embodiment, the client module 151 may transmit information resultant from executing the plurality of operations according to the plan to the intelligence server 200. The intelligence server 200 may identify that the received speech input has been properly processed using the result information.

According to an embodiment, the client module 151 may include a speech recognition module. According to an embodiment, the client module 151 may recognize the speech input to perform a limited function via the speech recognition module. For example, the client module 151 may execute an intelligence app to process the speech input to perform organic operations via a designated input (e.g., Wake up!).

According to an embodiment, the intelligence server 200 may receive information related to the user speech input from the user terminal 100 via a communication network. According to an embodiment, the intelligence server 200 may convert the data related to the received speech input into text data. According to an embodiment, the intelligence server 200 may generate a plan for performing the task corresponding to the user speech input based on the text data.

According to an embodiment, the plan may be generated by an artificial intelligence (AI) system. The AI system may be a rule-based system or a neural network-based system (e.g., feedforward neural network (FNN)) or recurrent neutral network (RNN)). The AI system may be a combination thereof or a system different therefrom. According to an embodiment, the plan may be selected from a set of pre-defined plans or created in real-time in response to a user request. For example, the AI system may select at least one plan from among a plurality of pre-defined plans.

According to an embodiment, the intelligence server 200 may transmit the result according to the generated plan to the user terminal 100 or transmit the generated plan to the user terminal 100. According to an embodiment, the user terminal 100 may display the result according to the plan on the display. According to an embodiment, the user terminal 100 may display the result of execution of the operation according to the plan on the display.

According to an embodiment, the intelligence server 200 may include a front end 210, a natural language platform 220, a capsule database (DB) 230, an execution engine 240, an end user interface 250, a management platform 260, a bigdata platform 270, or an analytic platform 280.

According to an embodiment, the front end 210 may receive the speech input from the user terminal 100. The front end 210 may receive a response corresponding to the speech input.

According to an embodiment, the natural language platform 220 may include an automatic speech recognition module (ASR module) 221, a natural language understanding module (NLU module) 223, a planner module 225, a natural language generator module (NLG module) 227, or a text to speech module (TTS module) 229.

According to an embodiment, the ASR module 221 may convert the user input received from the user terminal 100 into text data. According to an embodiment, the NLU module 223 may grasp the user's intent using the text data of the speech input. For example, the NLU module 223 may perform syntactic analysis or semantic analysis to grasp the user's intent. According to an embodiment, the NLU module 223 may grasp the meaning of a word extracted from the speech input using linguistic features (e.g., syntactic elements) of morphemes or phrases, match the grasped meaning of the word to the intent, and determine the user's intent.

According to an embodiment, the planner module 225 may generate a plan using the parameter and intent determined by the NLU module 223. According to an embodiment, the planner module 225 may determine a plurality of domains necessary to perform a task based on the determined intent. The planner module 225 may determine the plurality of operations included in the plurality of domains determined based on the intent. According to an embodiment, the planner module 225 may determine parameters necessary to execute the plurality of determined operations or resultant values output by execution of the plurality of operations. The parameters and resultant values may be defined in a designated format (or class) of concept. Thus, the plan may include the plurality of operations determined by the user's intent and a plurality of concepts. The planner module 225 may stepwise (or hierarchically) determine the relationship between the plurality of operations and the plurality of concepts. For example, the planner module 225 may determine the order of execution of the plurality of operations determined based on the user's intent based on the plurality of concepts. In other words, the planner module 225 may determine the order of execution of the plurality of operations based on the result output by execution of the plurality of operations and the parameters necessary to execute the plurality of operations. Thus, the planner module 225 may generate a plan that contains association information (e.g., ontology) between the plurality of operations and the plurality of concepts. A plan may be generated using information stored in the capsule DB 230 that stores a set of concept-operation relationships.

According to an embodiment, the NLG module 227 may convert designated information into a text type. The text-type information may be in the form of a natural language utterance. According to an embodiment, the TTS module 229 may convert text-type information into speech-type information.

According to an embodiment, all or some of the functions of the natural language platform 220 may also be implemented in the user terminal 100.

The capsule DB 230 may store information about the relationship between the plurality of concepts and operations corresponding to the plurality of domains. According to an embodiment, the capsule may include a plurality of concept objects (or concept information) and a plurality of action objects (or action information) included in the plan. According to an embodiment, the capsule DB 230 may store a plurality of capsules in the form of a concept action network (CAN). According to an embodiment, the plurality of capsules may be stored in a function registry included in the capsule DB 230.

The capsule DB 230 may include a strategy registry storing strategy information necessary to determine the plan corresponding to the speech input. The strategy information may include reference information for determining one plan if there is a plurality of plans corresponding to the speech input. According to an embodiment, the capsule DB 230 may include a follow up registry storing follow up information to propose a subsequent action to the user in a designated context. The subsequent action may include, e.g., a subsequent utterance. According to an embodiment, the capsule DB 230 may include a layout registry storing layout information about the information output via the user terminal 100. According to an embodiment, the capsule DB 230 may include a vocabulary registry storing vocabulary information included in capsule information. According to an embodiment, the capsule DB 230 may include a dialog registry storing dialog (or interaction) information with the user. The capsule DB 230 may update the stored object via a developer tool. The developer tool may include a function editor for updating, e.g., the action object or concept object. The developer tool may include a vocabulary editor for updating the vocabulary. The developer tool may include a strategy editor to generate and register a strategy to determine a plan. The developer tool may include a dialog editor to generate a dialog with the user. The developer tool may include a follow up editor capable of activating a subsequent goal and editing a subsequent utterance to provide a hint. The subsequent goal may be determined based on the current goal, the user's preference, or environmental conditions. According to an embodiment, the capsule DB 230 may also be implemented in the user terminal 100.

According to an embodiment, the execution engine 240 may produce a result using the generated plan. The end user interface 250 may transmit the produced result to the user terminal 100. Thus, the user terminal 100 may receive the result and provide the received result to the user. According to an embodiment, the management platform 260 may manage information used in the intelligence server 200. According to an embodiment, the bigdata platform 270 may gather user data. According to an embodiment, the analytic platform 280 may manage the quality of service (QoS) of the intelligence server 200. For example, the analytic platform 280 may manage the components and processing speed (or efficiency) of the intelligence server 200.

According to an embodiment, the service server 300 may include a CP Service A 301, a CP Service B 302, or a CP Service C 303, and may provide a designated service (e.g., food ordering or hotel booking) to the user terminal 100. According to an embodiment, the service server 300 may be a server operated by a third party. According to an embodiment, the service server 300 may provide information for generating the plan corresponding to the received speech input to the intelligence server 200. The provided information may be stored in the capsule DB 230. The service server 300 may provide result information according to the plan to the intelligence server 200.

In the above-described integrated intelligence system 10, the user terminal 100 may provide various intelligent services to the user in response to user inputs. The user inputs may include, e.g., inputs using physical buttons, touch inputs, or speech inputs.

According to an embodiment, the user terminal 100 may provide a speech recognition service via an intelligence app (or speech recognition app) stored therein. In this case, for example, the user terminal 100 may recognize the user utterance or speech input received via the microphone and provide the service corresponding to the recognized speech input to the user.

According to an embodiment, the user terminal 100 may perform a designated operation, alone or together with the intelligence server or service server, based on the received speech input. For example, the user terminal 100 may execute the app corresponding to the received speech input and perform a designated operation via the executed app.

According to an embodiment, when the user terminal 100, together with the intelligence server 200 or service server, provides the service, the user terminal may detect a user utterance using the microphone and generate a signal (or speech data) corresponding to the detected user utterance. The user terminal may transmit the speech data to the intelligence server 200 via the communication interface 110.

According to an embodiment, in response to the speech input received from the user terminal 100, the intelligence server 200 may generate a plan for performing the task corresponding to the speech input or the result of the operation performed according to the plan. The plan may include a plurality of actions for performing the task corresponding to the user's speech input and a plurality of concepts related to the plurality of actions. The concept may be one defining parameters input upon execution of the plurality of actions or one defining the resultant value output by execution of the plurality of actions. The plan may include association information between the plurality of actions and the plurality of concepts.

According to an embodiment, the user terminal 100 may receive the response via the communication interface 110. The user terminal 100 may output the speech signal generated inside the user terminal 100 to the outside using the speaker 130 or may output the image generated inside the user terminal 100 to the outside using the display 140.

Figure 2:
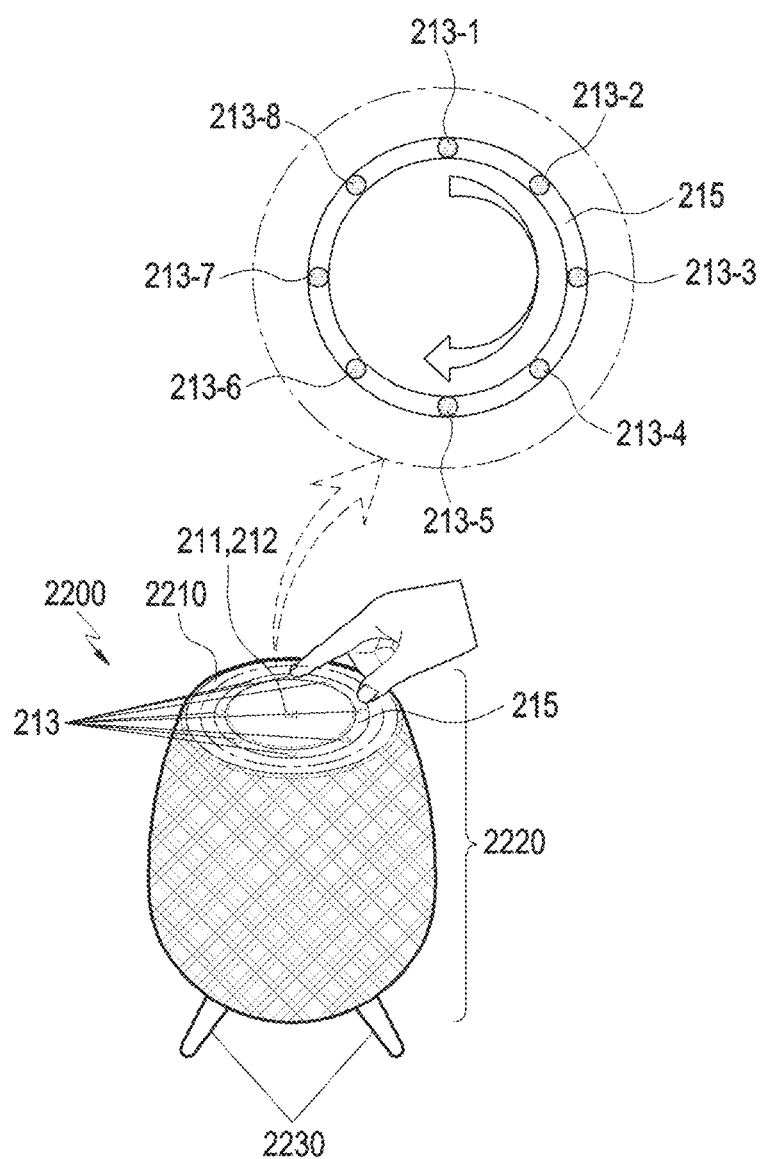
FIG. 2 is a perspective view illustrating an electronic device in an integrated intelligence system according to an embodiment of the disclosure.

FIG. 2 is a perspective view illustrating an electronic device in an integrated intelligence system according to an embodiment of the disclosure.

Referring to FIG. 2, according to an embodiment, an electronic device 2200 (e.g., the user terminal 100 of FIG. 1) in an integrated intelligence system may be an artificial intelligence (AI) speaker. Alternatively, the electronic device 2200 may be a different type of electronic device, e.g., a mobile phone, smartphone, PDA, laptop computer, desktop computer, or home appliance.

According to an embodiment, the electronic device 2200 may include a top surface 2210, a body 2220, or a mount 2230. According to an embodiment, an input unit 211, a display 212, and a plurality of microphones 213 may be placed on the top surface 2210.

According to an embodiment, the input unit 211 may include hardware keys or a touch input unit.

According to an embodiment, the display 212 may have a touchscreen or light emitting diodes (LEDs) to provide the user with visual effects or information.

According to an embodiment, the plurality of microphones 213 may be arranged at regular or irregular intervals on the top surface 2210 to receive audio signals (speech signals or non-speech signals) from the outside (e.g., outside of the top surface 2210). According to an embodiment, the top surface 2210 may include an area 215 which indicates a portion where the plurality of microphones 213 is arranged. For example, the area 215 indicating the portion where the plurality of microphones 213 is arranged may be provided as a hole or projection or to be distinguished from the rest, such as in a different color. The plurality of microphones 213 may receive a speech signal resultant from the user utterance and receive a non-speech audio signal resultant from a physical input (e.g., touch, tap, sweeping, or blocking) on the area 215 indicating the portion where the plurality of microphones 213 are arranged. For example, eight microphones 213-1 to 213-8 may be arranged on the top surface 2210 at regular intervals to form a specific shape (e.g., a circle or ring), and the hole (or projection or a specific color) area indicating the area where the eight microphones are arranged may be provided in a specific shape. Other modifications or changes may be made to the number of microphones and the area where the microphones are arranged. If the user performs a physical input to the microphone-arranged area of the top surface 2210, various patterns of non-speech audio signals may be received based on the intervals and shapes (circular or rectangular arrangement) of the plurality of microphones 213 and the kind of the physical input (e.g., input strength, input position, input speed, or input period).

According to an embodiment, the body 2220 may include a speaker. The speaker, shaped as an elliptical cylinder, may be exposed in whole or part to the outside of the body 2220, and a processor, memory, communication unit, or various electrical circuits associated with the electronic device 2200 may be included in the body 2220.

According to an embodiment, the mount 2230 may be provided under the body 2220 to stably prop the body 2220 against the floor. The user may make use of the mount 2230. According to an embodiment, the mount 2230 may be provided to be detachable from the body 2220.

Figure 3:
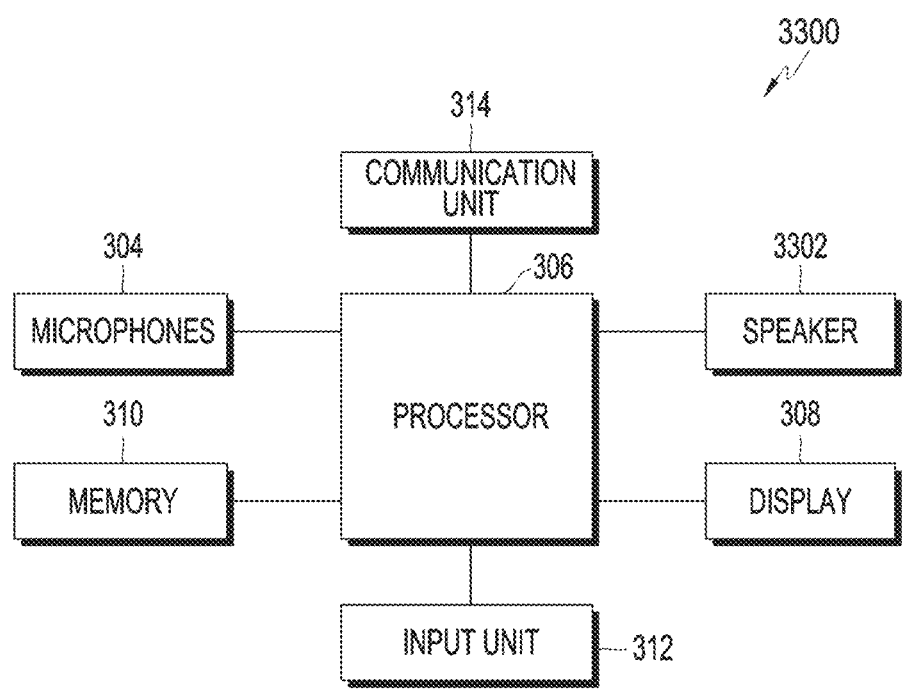
FIG. 3 is a block diagram illustrating an electronic device according to an embodiment of the disclosure.

FIG. 3 is a block diagram illustrating an electronic device according to an embodiment of the disclosure.

Referring to FIG. 3, an electronic device 3300 (e.g., the user terminal 100 of FIG. 1 or the electronic device 2200 of FIG. 2) may include a speaker 3302, microphones 304, a processor 306, a display 308, a memory 310, an input unit 312, and a communication unit 314.

According to an embodiment, the speaker 3302 may output audio signals under the control of the processor 306. For example, the speaker 3302 may output at least one audio signal, which is generated inside the electronic device 3300 or is received via communication from the outside, under the control of the processor 306.

According to an embodiment, the microphones 304 (e.g., the plurality of microphones 213 of FIG. 2) may receive the audio signals. For example, the microphones 304 may receive a speech audio signal based on a user utterance or receive a non-speech audio signal resultant from a physical input (e.g., a touch, tap, sweeping, or blocking) on the area indicating the portion where the plurality of microphones 213 are arranged. For example, the touch may be an input of tap on at least one microphone, the sweeping may be an input of sweeping on at least one microphone, and the blocking may be an input of hiding at least one from the outside, e.g., using a finger.

According to an embodiment, the processor 306 may control the overall operation of the electronic device 3300. According to an embodiment, the processor 306 may include one or more processors. According to an embodiment, the processor 306 may identify a user input received via the input unit 312. According to an embodiment, the processor 306 may control the display 308 to display data (e.g., images or videos). According to an embodiment, the processor 306 may fetch, store, or execute necessary information (e.g., instructions or information associated with the instructions) from the memory 310. According to an embodiment, the processor 306 may control the speaker 301 to output at least one sound.

According to an embodiment, the processor 306 may process audio signals (speech audio signals or non-speech audio signals) received via the microphones 304. According to an embodiment, the processor 306 may perform sound audio processing and non-sound audio processing each on the audio signals received via the microphones 304. According to an embodiment, the processor 306 may perform first pre-processing (e.g., first audio processing) on the audio signals received via the microphones 304 and obtain speech audio signals based on the first pre-processed signals and perform speech recognition. According to an embodiment, the processor 306 may perform the first pre-processing to remove (or cancel) noise or echoes caused by the ambient environment from the audio signal and to enhance the signal of the voice frequency band (e.g., the frequency band in which the human voices are distributed) from the audio signal. For example, the processor 306 may perform the first pre-processing to filter the audio signal to extract the voice frequency band signal or to remove noise or echoes and amplify the voice frequency band signal. According to an embodiment, the processor 306 may perform second pre-processing (e.g., second audio processing) on the audio signals received via the microphones 304 and obtain non-speech audio signals based on the second pre-processed signals and perform non-speech recognition. According to an embodiment, the processor 306 may perform the second pre-processing to enhance the non-speech audio signal (e.g., the non-speech audio signal pattern when the user performs a physical input to the area indicating where the plurality of microphones 213 are arranged) from the audio signal. For example, the processor 306 may perform the second pre-processing to remove noise or echoes caused by the ambient environment from the audio signal and amplify the non-speech audio signal pattern. For example, the processor 306 may preserve and enhance the non-speech audio signal in the entire band via the second pre-processing, unlike the first pre-processing to enhance the speech signal. For example, the processor 306 may perform the second pre-processing using the high-frequency harmonics after the frequency spectrum including the voice frequency band or the entire frequency band. In this case, the other signals (speech, noise, or echoes) than the non-speech audio signal may be removed.

According to an embodiment, the processor 306 may identify the non-speech audio signal pattern from the received audio signal based on speech audio processing and non-speech audio processing. According to an embodiment, the processor 306 may perform an action (or operation) corresponding to a non-speech audio signal pattern-based command.

According to an embodiment, the display 308 may display a screen of executing (or performing) an image or video or an application (or function). For example, the display 308 may display a graphic user interface (GUI) of the application. According to an embodiment, the display 308 may include a light emitting diode (LED) and indicate, e.g., whether the application runs or how the application proceeds via the LED.

According to an embodiment, the memory 310 may store instructions and data to enable the processor 306 to operate. According to an embodiment, the memory 310 may store at least one application (or at least one function). The plurality of applications or functions stored in the memory 310 may be selected, executed, and operated according to a user input or occurrence of a designated condition. For example, while a first application (e.g., a music player app) (or a first function) is executed and operated, a second application (e.g., a speech recognition app or intelligence app) (or a second function) may be executed and operated according to a user input or occurrence of a designated condition. According to an embodiment of the disclosure, the memory 310 may include a database that may store information necessary to recognize user inputs. For example, the memory 310 may include a log database capable of storing log information. As another example, the memory 310 may include a persona database capable of storing user information. According to an embodiment, the memory 310 may store an intelligent application (e.g., a speech recognition application) interworking with an intelligent agent (e.g., a speech audio signal processing unit). If the intelligent application interworking with the intelligent agent is executed, the processor 306 may execute the intelligent application interworking with the intelligent agent and receive and process information (data or command) by a non-speech audio signal according to execution by the user of a physical input to the area indicating the portion where the plurality of microphones 213 are arranged or/and a speech audio signal by the user's utterance. According to an embodiment, the intelligent application interworking with the intelligent agent may be operated by a specific input (e.g., an input via a hardware key, an input via the touchscreen, a specific speech audio signal (e.g., a preconfigured speech signal, wake-up signal, or user speech signal) or a specific non-speech audio signal (e.g., a specific non-speech audio signal pattern according to a performing of a specific physical input on the microphones 213) (or upon wake-up).

According to an embodiment, the input unit 312 may receive a user input from the user. According to an embodiment, the input unit 312 may include a touchscreen combined with the display 308 (e.g., a touchscreen display). According to an embodiment, the input 312 may include hardware keys (or physical keys) positioned in the electronic device 3300 (or in the housing (e.g., on the top surface 2210 of FIG. 2) of the electronic device 3300). According to an embodiment, the input unit 312 may receive a user input from an external electronic device (e.g., a keyboard, headset, remote controller, or smartphone) connected with the electronic device 3300.

According to an embodiment, the speaker 3302 may output at least one or more sounds. According to an embodiment, the sound may be of various types. For example, the sound may include a music sound or a sound corresponding to various pieces of information (e.g., information by the app, information obtained upon wake-up, or information obtained based on the speech audio signal by the user or the non-speech audio signal by the user). For example, the speaker 3302 may output at least one sound, which is generated inside the electronic device 3300 or is received via communication from the outside.

According to an embodiment, an electronic device (e.g., the user terminal 100 of FIG. 1, the electronic device 2200 of FIG. 2, or the electronic device 3300 of FIG. 3) comprises a speaker (e.g., the speaker 3302 of FIG. 3), a plurality of microphones (e.g., the plurality of microphones 213 of FIG. 2 or the microphones of FIG. 3), at least one processor (e.g., the processor 306 of FIG. 3) operatively connected with the speaker and the plurality of microphones, and a memory (e.g., the memory 310 of FIG. 3) operatively connected with the at least one processor, wherein the memory configured to store instructions which, when executed, cause the at least one processor to perform speech audio processing or non-speech audio processing on audio signals received via the plurality of microphones, upon obtaining a non-speech audio signal based on the speech audio processing or the non-speech audio processing, identify a non-speech audio signal pattern corresponding to the non-speech audio signal, obtain the non-speech audio signal-based first command based on the identified non-speech audio signal pattern, and perform at least one action corresponding to the obtained first command. Other embodiments are also possible.

According to an embodiment, the instructions may cause (or enable) the at least one processor to, upon obtaining a speech audio signal based on the speech audio processing, perform speech recognition on the speech audio signal and perform at least one action corresponding to the speech recognition-based second command.

According to an embodiment, the non-speech audio signal may be a signal obtained by using the plurality of microphones based on a physical input to at least part of the plurality of microphones or at least part of an area where the plurality of microphones are arranged.

According to an embodiment, the instructions may enable the at least one processor to perform first pre-processing associated with a speech audio signal upon the speech audio processing and perform second pre-processing associated with the non-speech audio signal upon the non-speech audio processing.

According to an embodiment, the second pre-processing may include at least one of noise removal (or cancellation) processing and echo removal (or cancellation) processing on the received audio signals.

According to an embodiment, the memory may store a plurality of non-speech audio signal pattern models, and the instructions may enable the at least one processor to identify a non-speech audio signal pattern corresponding to the non-speech audio signal based on the plurality of stored non-speech audio signal pattern models.

According to an embodiment, the memory may further store a plurality of commands individually corresponding to the plurality of non-speech audio signal pattern models, and the instructions may enable the at least one processor to obtain the non-speech audio signal-based first command corresponding to the identified non-speech audio signal pattern based on the plurality of commands individually corresponding to the plurality of non-speech audio signal pattern models.

According to an embodiment, the instructions may enable the at least one processor to associate a command input by a user with the non-speech audio signal pattern obtained from the signals received from the plurality of microphones by a physical input to at least part of the plurality of microphones or at least part of an area where the plurality of microphones are arranged and store them.

According to an embodiment, the electronic device may further comprise a communication unit including, for example, a transceiver. The instructions may enable the at least one processor to transmit the obtained non-speech audio signal pattern to an external electronic device via the communication unit.

Figure 4:
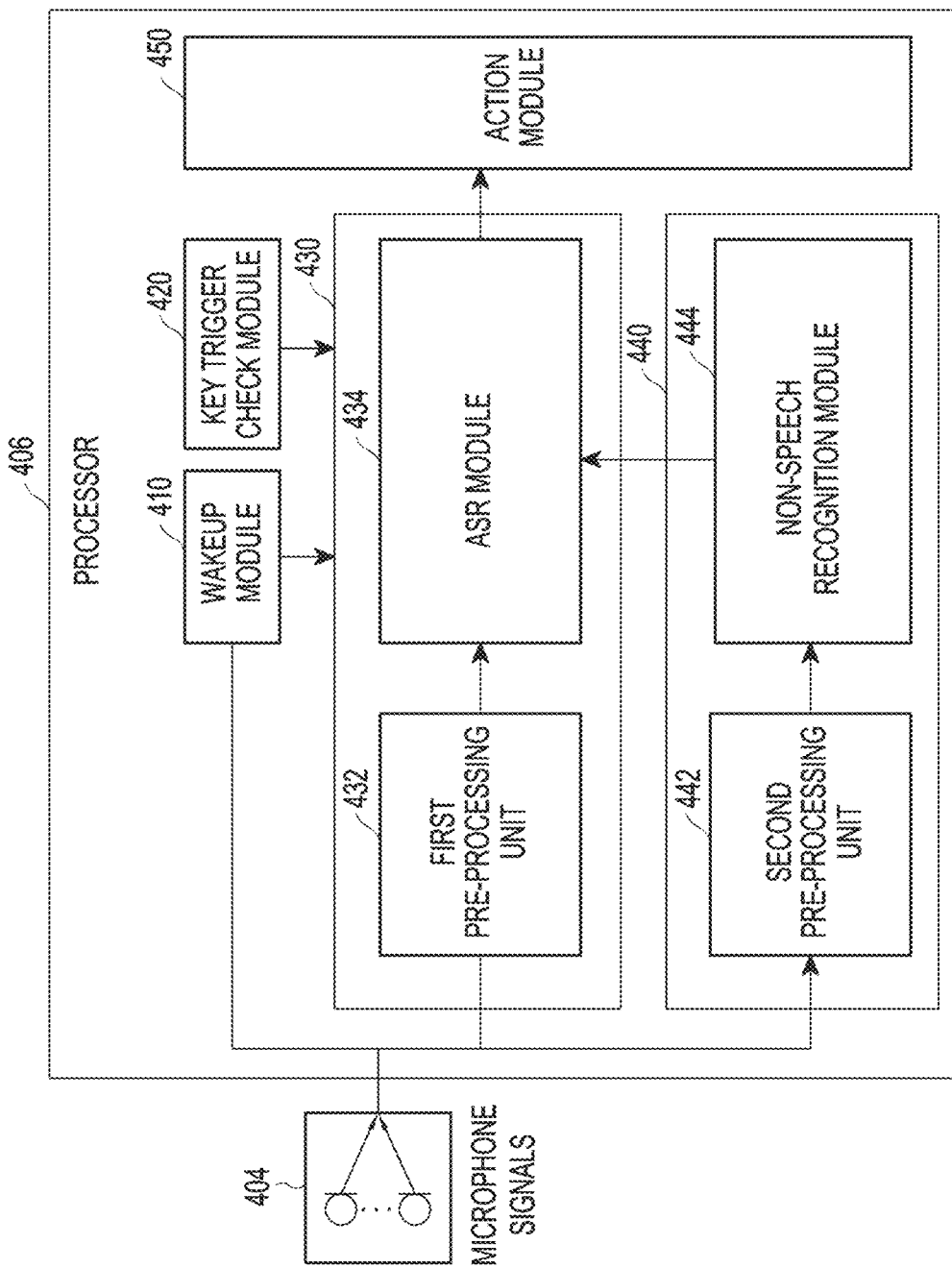
FIG. 4 is a block diagram illustrating a processor of an electronic device according to an embodiment of the disclosure.

FIG. 4 is a block diagram illustrating a processor of an electronic device according to an embodiment of the disclosure.

Referring to FIG. 4, a processor 406 (e.g., the processor 306 of FIG. 3) of an electronic device (e.g., the user terminal 100 of FIG. 1, the electronic device 2200 of FIG. 2, or the electronic device 3300 of FIG. 3) may include several modules (or units). Several modules mentioned according to various embodiments may be implemented in hardware or software.

According to an embodiment, the processor 406 may include a wakeup module 410, a key trigger check module 420, a speech audio signal processing unit 430, a non-speech audio signal processing unit 440, or an action module 450, or may perform the functions of the wakeup module 410, key trigger check module 420, speech audio signal processing unit 430, non-speech audio signal processing unit 440, or action module 450.

According to an embodiment, the wakeup module 410 may identify whether it wakes up based on audio signals (e.g., a designated speech signal (e.g., Bixby! or wake up!) from a plurality of microphones 404 and provide a wakeup signal to the speech audio signal processing unit 430. According to an embodiment, the wakeup module 410 may be implemented as a low-power processor (e.g., a processor included in an audio codec).

According to an embodiment, the key trigger check module 420 may identify whether a hardware or software key input is there and provide the key input signal to the speech audio signal processing unit 430.

According to an embodiment, the speech audio signal processing unit 430 may be activated (or executed or operated) when the wakeup signal or key input signal or a designated condition is met. For example, when the wakeup signal or key input signal or designated condition is met, a speech recognition application (or speech recognition function) may be executed. According to an embodiment, the speech audio signal processing unit 430 may include a first pre-processing unit 432 and a speech recognition module (e.g., an automatic speech recognition (ASR) module) 434.

According to an embodiment, the first pre-processing unit 432 may perform first pre-processing to enhance the signal of a voice frequency band (e.g., the frequency band in which the human voices are distributed) from audio signals received from the plurality of microphones 404. According to an embodiment, the first pre-processing unit 432 may perform the first pre-processing to filter the received audio signal to extract a voice frequency band speech audio signal or amplify the voice frequency band speech audio signal. For example, the first pre-processing unit 432 may perform an adaptive echo canceller (AEC) operation, a noise suppression (NS) operation, an end-point detection (EPD) operation, or/and an automatic gain control (AGC) operation. The AEC unit may remove echoes contained in the received audio signal. The NS module may suppress background noise contained in the received audio signal. The EPD module may detect the end point of the user's speech contained in the received audio signal and discover the portion where the user's speech is present. The AGC module may recognize the speech from the audio signal and adjust the volume of the signal corresponding to the speech portion to be suitable for processing.

The ASR module 434 may recognize the speech audio signal from the pre-processed audio signal and obtain the information (data or command) corresponding to the speech audio signal. According to an embodiment, the ASR module may include an intelligent agent.

According to an embodiment, the intelligent agent may speech-recognize the speech audio signal obtained from the received audio signal and obtain information (data or command) for performing the operation of an application (or function) based on speech recognition. For example, the intelligent agent may obtain information for performing the operation, e.g., "tell me today's weather," of a weather forecast information (or weather forecast function) from the speech audio signal. As another example, the intelligent agent may obtain information (data or command) for performing a second operation while performing a first operation of the application (or function). For example, the intelligent agent may obtain information for performing the operation to play another song, such as "Play another song," from the speech audio signal while performing a music output operation via a music application (or function). According to an embodiment, the intelligent agent may provide the speech audio signal to the intelligence server 200 to allow the intelligence server 200 to obtain information (data or command) to recognize the speech audio signal and perform the operation of the application (or function) and may receive the obtained information. According to an embodiment, the intelligent agent may assist the intelligence server 200 and perform limited recognition of the user's speech audio signal or may obtain the information corresponding to the recognized speech audio signal. According to an embodiment, the intelligent agent may be implemented as a separate processor. According to an embodiment, the intelligent agent may recognize the user's input using a speech recognition algorithm. The algorithm used to recognize voice may be at least one of, e.g., a Hidden Markov Model (HMM) algorithm, an artificial neural network (ANN) algorithm, or a dynamic time warping (DTW) algorithm. According to an embodiment, the intelligent agent may convert the user's speech input into text data. According to an embodiment, the intelligent agent may deliver the user's speech to the intelligence server 200 and receive the converted text data. The text data may be displayed on the display 308.

According to an embodiment, the non-speech audio signal processing unit 440 may perform second pre-processing (e.g., second audio processing) on the audio signals received via the microphones 404 and obtain non-speech audio signals based on the second pre-processed signals and perform non-speech recognition. According to an embodiment, the non-speech audio signal processing unit 440 may include a second pre-processing unit 442 and a non-speech recognition module 444. According to an embodiment, the second pre-processing unit 442 may perform the second pre-processing to enhance the non-speech audio signal (e.g., the non-speech audio signal pattern when the user performs a physical input to the area indicating where the plurality of microphones 213 are arranged) from the audio signal. According to an embodiment, the second pre-processing unit 442 may perform the second pre-processing to remove noise or echoes caused by the ambient environment from the audio signal and amplify the non-speech audio signal pattern. According to an embodiment, the second pre-processing unit 442 may obtain the signal of the frequency band where the non-speech audio signal pattern belongs by filtering the frequency band where the non-speech audio signal pattern belongs. According to an embodiment, the first pre-processing unit may include a beamforming algorithm, and the second pre-processing unit may include no beamforming algorithm.

According to an embodiment, the non-speech recognition module 444 may recognize (or identify) the non-speech audio signal pattern from the second pre-processed audio signal and obtain information (data or command) based on the recognized non-speech audio signal pattern.

According to an embodiment, the action module 450 may perform the action corresponding to a speech recognition-based command or non-speech audio signal pattern-based command. According to an embodiment, the action module 450 may include an execution manager module. The execution manager module may execute (or perform) an application (or function) or perform the operation of the application (or function) based on a speech recognition-based command or non-speech audio signal pattern-based command.

Figure 5:
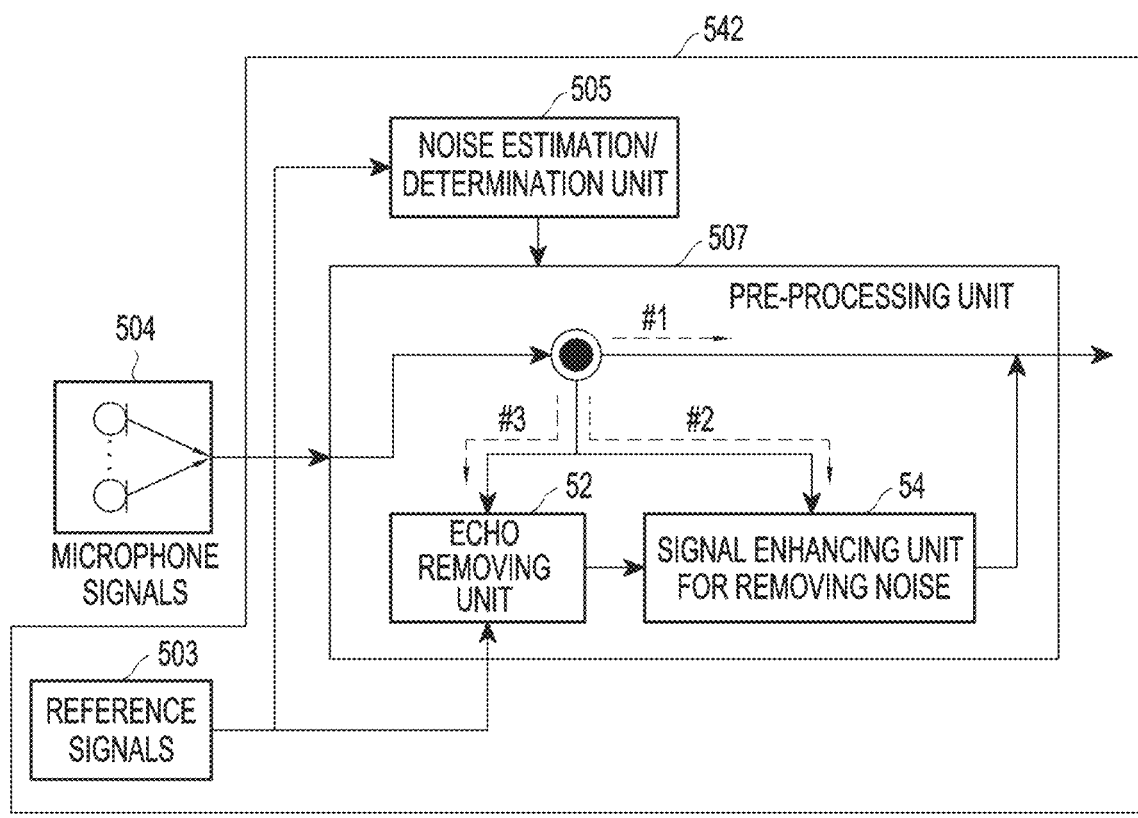
FIG. 5 is a block diagram illustrating a second preprocessing unit of an electronic device according to an embodiment of the disclosure.

FIG. 5 is a block diagram illustrating a second pre-processing unit of an electronic device according to an embodiment of the disclosure.

Referring to FIG. 5, according to an embodiment, a second pre-processing unit 542 (e.g., the second pre-processing unit 442 of FIG. 4) may include a reference signal unit 503, a noise estimation/determination unit 505, and a pre-processing unit 507.

According to an embodiment, the reference signal unit 503 may provide a sound signal, which is being output via a speaker (e.g., the speaker 3302 of FIG. 3) of the electronic device (e.g., the electronic device 3300 of FIG. 3), as a reference signal. For example, if music is being output, the reference signal unit 503 may provide a music sound signal as the reference signal. According to an embodiment, the reference signal unit 503 may not provide the reference signal if no sound signal is being output via the speaker 3302.

According to an embodiment, the noise estimation/determination unit 505 may identify whether there is a sound signal being currently output and, if any, its kind (whether it is music) based on the reference signal and compare the sound signal being currently output with the audio signals received from microphones 504 to thereby determine the current noise level (e.g., noise level or amplitude) of the surroundings. For example, the noise estimation/determination unit 505 may identify that the current noise level is any one of a plurality of levels (e.g., a low level, a mid level, or a high level) using a predesignated noise threshold.

According to an embodiment, the pre-processing unit 507 may pre-process the audio signals received from the microphones 504 based on the noise level and whether music is played. According to an embodiment, the pre-processing unit 507 may include an echo removing (or cancelling) unit 52 and a signal enhancing unit 54 for removing noise. According to an embodiment, the echo removing unit 52 may remove echoes from the audio signals received from the microphones 504. According to an embodiment, the signal enhancing unit for removing noise (or noise removing (or cancelling) unit) 54 may remove noise caused by the ambient environment and amplify some signals to obtain the non-speech audio signal pattern from the noise-removed audio signal. According to an embodiment, the pre-processing unit 507 may refrain from pre-processing the audio signals received from the microphones 504 or may remove echoes or/and noise from the audio signals received from the microphones 504, based on the noise level (e.g., noise amplitude in dBm) of the ambient environment. For example, when the noise level is a low level, the pre-processing unit 507 may output an audio signal (e.g., a first audio signal) that has not undergone pre-processing as in path #1. When the noise level is a mid level, the pre-processing unit 507 may output an audio signal (e.g., a second audio signal) that has undergone noise removal as in path #2 or may output the first audio signal and the second audio signal together. The pre-processing unit 507 may output an audio signal (e.g., a third audio signal) that has undergone echo removal and noise removal as in path #3 if the noise level is a high level or if there is the reference signal (e.g., a barge-in context. For example, when echo is highly likely to occur). According to an embodiment, the non-preprocessed audio signal or the audio signal second-processed by the second pre-processing unit 542 may be provided to the non-speech recognition module (e.g., the non-speech recognition module 444 of FIG. 4).

Figure 6:
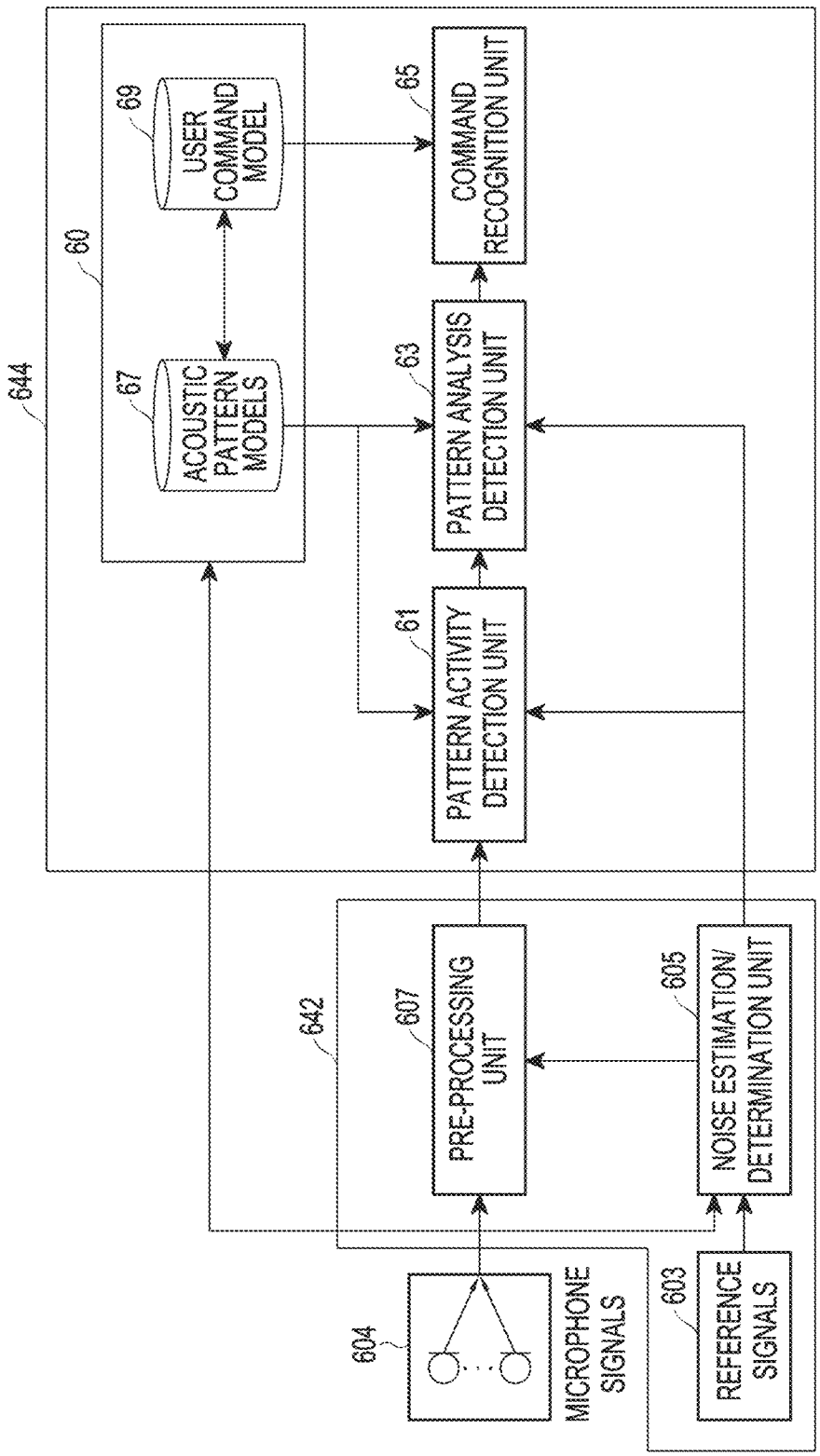
FIG. 6 is a block diagram illustrating a non-speech recognition module of an electronic device according to an embodiment of the disclosure.

FIG. 6 is a block diagram illustrating a non-speech recognition module of an electronic device according to an embodiment of the disclosure.

Referring to FIG. 6, according to an embodiment, a non-speech recognition module 644 (e.g., the non-speech recognition module 444 of FIG. 4) may receive the audio signals received by microphones 604 (e.g., the microphones 213 of FIG. 2, the microphones 304 of FIG. 3, the microphones 404 of FIG. 4, or the microphones 504 of FIG. 5), without pre-processing, or may receive the audio signal pre-processed via a second pre-processing unit 642. The second pre-processing unit 642 may include a reference signal unit 603, a noise estimation determination unit 605, and a pre-processing unit 607. According to an embodiment, the operations of the microphones 604 and the second pre-processing unit 642 may be the same as the operations of the microphones 504 and second pre-processing unit 542 of FIG. 5.

According to an embodiment, the non-speech recognition module 644 may include a non-speech audio signal pattern registration unit 60, a pattern activity detection unit 61, a pattern analysis detection unit 63, and a command recognition unit 65.

According to an embodiment, the non-speech audio signal pattern registration unit 60 may include an acoustic pattern model storage unit 67 and a user command model storage unit 69.

According to an embodiment, the non-speech audio signal pattern registration unit 60 may register or store non-speech audio signal pattern models of the manufacturer of the electronic device (e.g., the user terminal 100 of FIG. 1, the electronic device 2200 of FIG. 2 or the electronic device 3300 of FIG. 3. The electronic device 3300 of FIG. 3 is described below as an example) in the acoustic pattern model storage unit 67 or may register or store various non-speech audio signal pattern models obtained as the user of the electronic device 3300 performs a physical input to the microphones 304 or the area (e.g., 215 of FIG. 2) indicating the portion where the microphones 304 are arranged in the acoustic pattern model storage unit 67. According to an embodiment, the non-speech audio signal pattern registration unit 60 may learn non-speech audio signal patterns based on physical inputs on the user's microphones 304 using signal processing-based classifier or learning-based classifier and update the non-speech audio signal pattern models based on the result of learning.

According to an embodiment, the non-speech audio signal pattern registration unit 60 may store the commands individually associated with the non-speech audio signal pattern models in the user command model storage unit 69. According to an embodiment, the non-speech audio signal pattern registration unit 60 may learn matching between the non-speech audio signal patterns and the associated commands using the signal processing-based classifier or learning-based classifier and update the commands associated with the non-speech audio signal patterns according to the result of learning.

According to an embodiment, the pattern activity detection unit 61 may detect the start and end of the non-speech audio signal pattern from the non-preprocessed audio signal or the audio signal second pre-processed by the second pre-processing unit 642. For example, if the user performs a physical input to the microphones 604 or the area (e.g., 215 of FIG. 2) where the microphones 604 are arranged, various patterns of non-speech audio signals may be received based on the intervals and shapes (circular or rectangular arrangement) of the plurality of microphones 213 and the kind of the physical input (e.g., input scheme, input strength, input position, input speed, or input period). Since the physical input to the microphones 604 may contact at least one of the microphones 604 or a hole through which sound is introduced to the microphones 604 (or its adjacent area (e.g., 215 of FIG. 2)), the component of the non-speech audio signal by the physical contact may be distributed in a broader band than the voice frequency band or the whole band of the frequency (e.g., audible frequency) and, upon contact, the amplitude of the speech audio signal component sharply increases, and upon non-contact, the amplitude of the non-speech audio signal component may sharply reduce. According to an embodiment, the pattern activity detection unit 61 may detect the start and end of the non-speech audio signal pattern from the second-preprocessed audio signal based on the characteristics of the non-speech audio signal by the physical input to the microphones 604 or the area (e.g., 215 of FIG. 2) where the microphones 604 are arranged. For example, if the audio signal the component of which is distributed in a broader band than the voice frequency band or the whole band of the frequency (e.g., audible frequency) is received, the pattern activity detection unit 61 may detect the start of the received audio signal as the start of the non-speech audio signal pattern. According to an embodiment, if the start of the non-speech audio signal pattern is detected and then the non-speech audio signal pattern is not received, the pattern activity detection unit 61 may detect the time when it is not received as the end of the non-speech audio signal pattern or, in a case where the non-speech audio signal pattern is continuously received, if a designated time arrives (e.g., the maximum length of the non-speech audio signal pattern), the pattern activity detection unit 61 may detect the designated time as the end of the non-speech audio signal pattern. For example, if the physical input associated with the microphones 604 arranged on a circumference (e.g., in the shape of a ring) is made in such a sweeping type as if it draws a semi-circle or a full circle by the user (e.g., the user's hand), the non-speech audio signal pattern corresponding to the sweeping input from the start of the input to the semicircle and the non-speech audio signal pattern corresponding to the sweeping input from the start of the input to the full circumference may be distinguished by the time interval between the start and end of the non-speech audio signal pattern and, thus, it may be useful to detect the designated time as the end of the non-speech audio signal pattern. According to an embodiment, the pattern activity detection unit 61 may learn several times the detection of the start and end of the non-speech audio signal pattern from the second-preprocessed audio signal using a signal processing-based classifier or learning-based classifier and raise the detection speed and accuracy of detection of the start and end of the non-speech audio signal pattern from the second-preprocessed audio signal according to the result of learning.

According to an embodiment, the pattern analysis detection unit 63 may compare the non-speech audio signal pattern obtained by the detection of the start and end of the non-speech audio signal pattern with the non-speech audio signal pattern models stored in the acoustic pattern model storage unit 67, thereby obtaining at least one matching non-speech audio signal pattern model. For example, the pattern analysis detection unit 63 may compare the non-speech audio signal pattern models stored in the acoustic pattern model storage unit 67 with the non-speech audio signal pattern obtained by the detection of the start and end of the non-speech audio signal pattern to thereby detect a similarity (degree of similarity) and identify at least one non-speech audio signal pattern model for which the similarity is not less than a predetermined threshold. According to an embodiment, the pattern analysis detection unit 63 may learn several times the comparison between the stored non-speech audio signal pattern models and the non-speech audio signal pattern and the detection of the similarity using the signal processing-based classifier or learning-based classifier and raise the speed and accuracy of the comparison between the stored non-speech audio signal pattern models and the non-speech audio signal pattern and the detection of the similarity according to the result of learning.

According to an embodiment, the command recognition unit 65 may recognize the command corresponding to at least one non-speech audio signal pattern model identified by the pattern analysis detection unit 63, based on commands individually associated with the non-speech audio signal pattern models stored in the user command model storage unit 69.

Figure 7:
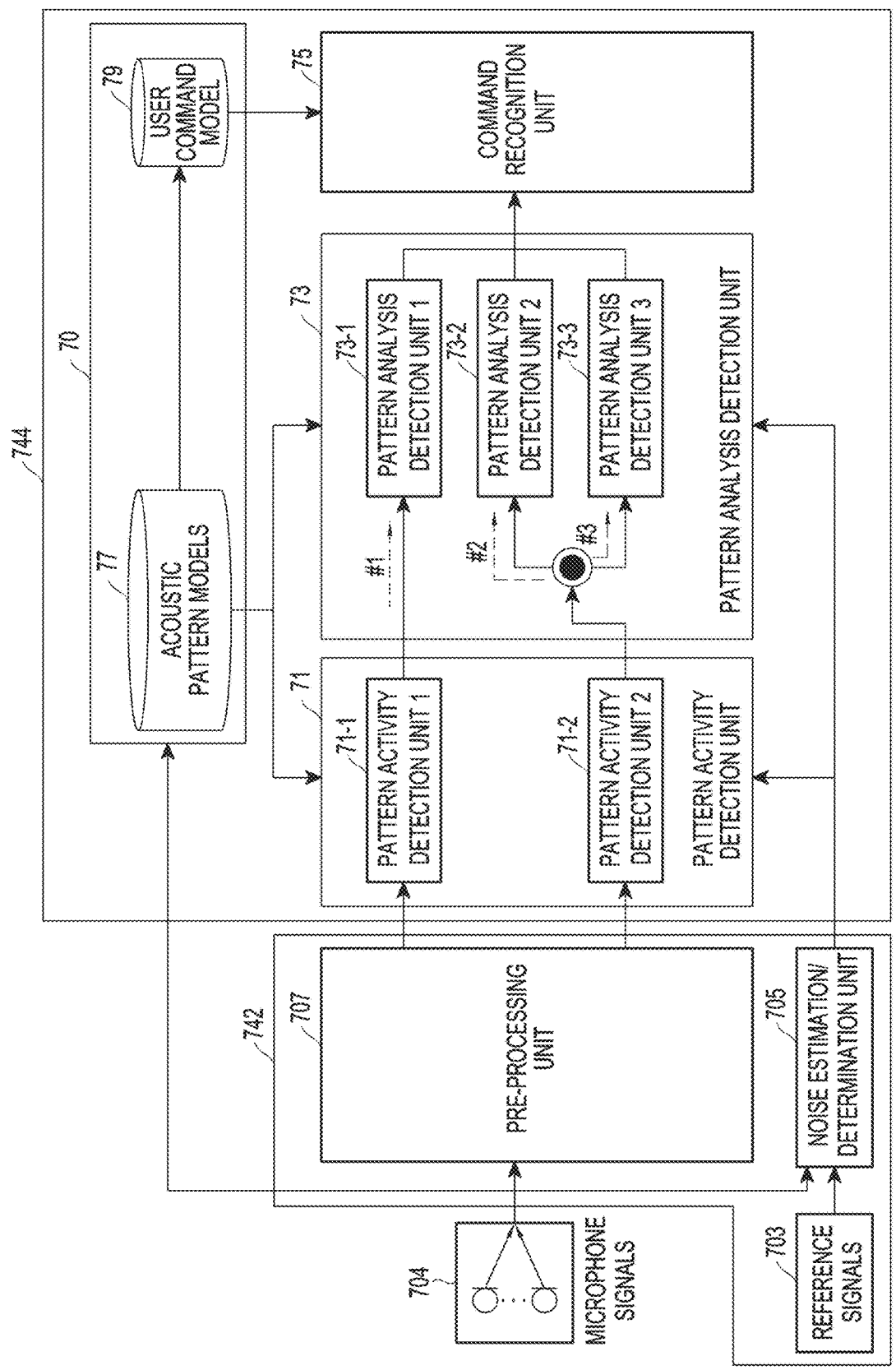
FIG. 7 is a block diagram illustrating a non-speech recognition module including a plurality of pattern activity detection units and a plurality of pattern analysis detection units of an electronic device according to an embodiment of the disclosure.

FIG. 7 is a block diagram illustrating a non-speech recognition module including a plurality of pattern activity detection units and a plurality of pattern analysis detection units of an electronic device according to an embodiment of the disclosure.

Referring to FIG. 7, according to an embodiment, a non-speech recognition module 744 may include models 70, including an acoustic pattern model 77 and a user command model 79, a pattern activity detection unit 71, a pattern analysis detection unit 73, and a command recognition unit 75. The pattern activity detection unit 71 of the non-speech recognition module 744 may include a plurality of pattern activity detection units (or a plurality of pattern activity engines) 71-1 and 71-2 to raise pattern activity detection performance, and the pattern analysis detection unit 73 may include a plurality of pattern analysis detection units (or a plurality of pattern analysis engines) 73-1, 73-2, and 73-3 to raise pattern analysis detection performance.

According to an embodiment, the pattern activity detection unit 71 may selectively use all or some of the plurality of pattern activity detection units (pattern activity detection unit 1 71-1 and pattern activity detection unit 2 71-2) based on the noise level and whether music plays. According to an embodiment, pattern activity detection unit 1 71-1 may detect the start and end of the non-speech audio signal pattern from a first audio signal provided from a second pre-processing unit 742 when the noise level is low and no reference signal exists. The second pre-processing unit 742 may include a reference signal unit 703, a noise estimation determination unit 705, and a pre-processing unit 707. According to an embodiment, pattern activity detection unit 2 71-2 may detect the start and end of the non-speech audio signal pattern from a pre-processed third audio signal provided from the second pre-processing unit 742 when the noise level is high and a reference signal exists (e.g., when music plays under high noise).

According to an embodiment, the pattern analysis detection unit 73 may selectively use all or some of a plurality of pattern analysis detection units (pattern analysis detection unit 1 73-1, pattern analysis detection unit 2 73-2, and pattern analysis detection unit 3 73-3) based on the noise level and whether music plays.

According to an embodiment, when the noise level is low along path #1, and no reference signal exists, pattern analysis detection unit 1 73-1 may receive the non-speech audio signal pattern obtained by the detection of the start and end of the non-speech audio signal pattern from pattern analysis detection unit 1 73-1, compare the received non-speech audio signal pattern with the non-speech audio signal pattern models stored in the acoustic pattern model storage unit 77, and obtain at least one matching non-speech audio signal pattern model.

According to an embodiment, when the noise level is high, and a reference signal exists (e.g., when music is playing), pattern analysis detection unit 2 73-2 and pattern analysis detection unit 3 73-3 may receive the non-speech audio signal pattern obtained by the detection of the start and end of the non-speech audio signal pattern from pattern analysis detection unit 2 73-2 along path #2 and path #3, respectively, compare the received non-speech audio signal pattern with the non-speech audio signal pattern models stored in the acoustic pattern model storage unit 77, and obtain at least one matching non-speech audio signal pattern model. The pattern analysis detection unit 73 may use at least one non-speech audio signal with a high matching degree among the plurality of non-speech audio signal pattern models obtained from pattern analysis detection unit 2 73-2 and pattern analysis detection unit 3 73-3, respectively.

According to an embodiment, although it has been described above in connection with FIG. 7 that the pattern activity detection unit 71 includes two detection units and the pattern analysis detection unit 73 includes three detection units, as an example, the non-speech recognition module 744 may include more or less detection units.

According to an embodiment, a controlling method using a non-speech audio signal in an electronic device may comprise performing speech audio processing or non-speech audio processing on audio signals received via a plurality of microphones (e.g., the plurality of microphones 213 of FIG. 2, the microphones 304 of FIG. 3, the microphones 404 of FIG. 4, the microphones 504 of FIG. 5, the microphones 604 of FIG. 6, or microphones 704 of FIG. 7), obtaining a non-speech audio signal based on the speech audio processing or the non-speech audio processing, identifying a non-speech audio signal pattern corresponding to the non-speech audio signal, obtaining the non-speech audio signal-based first command based on the identified non-speech audio signal pattern, and performing at least one action corresponding to the obtained first command.

According to an embodiment, the method may further comprise, upon obtaining a speech audio signal based on the speech audio processing, performing speech recognition on the speech audio signal and performing at least one action corresponding to the speech recognition-based second command.

According to an embodiment, the non-speech audio signal may be a signal obtained by using the plurality of microphones based on a physical input to at least part of the plurality of microphones or at least part of an area where the plurality of microphones are arranged.

According to an embodiment, the method may further comprise performing first pre-processing associated with the speech audio signal upon the speech audio processing and performing second pre-processing associated with the non-speech audio signal upon the non-speech audio processing.

According to an embodiment, the second pre-processing may include at least one of noise removal processing and echo removal processing on the received audio signals.

According to an embodiment, the method may identify a non-speech audio signal pattern corresponding to the non-speech audio signal, based on a plurality of pre-stored non-speech audio signal pattern models.

According to an embodiment, the method may obtain the non-speech audio signal-based first command corresponding to the identified non-speech audio signal pattern, based on the plurality of commands individually corresponding to the plurality of pre-stored non-speech audio signal pattern models.

According to an embodiment, the method may further comprise associating a command input by a user with the non-speech audio signal pattern obtained from signals received from the plurality of microphones by a physical input to at least part of the plurality of microphones or at least part of an area where the plurality of microphones are arranged and storing the command associated with the non-speech audio signal pattern.

According to an embodiment, the method may further comprise transmitting the obtained non-speech audio signal pattern to an external electronic device via a communication unit and associating a command with the obtained non-speech audio signal pattern and storing the command associated with the non-speech audio signal pattern according to a request from the external electronic device.

Figure 8:
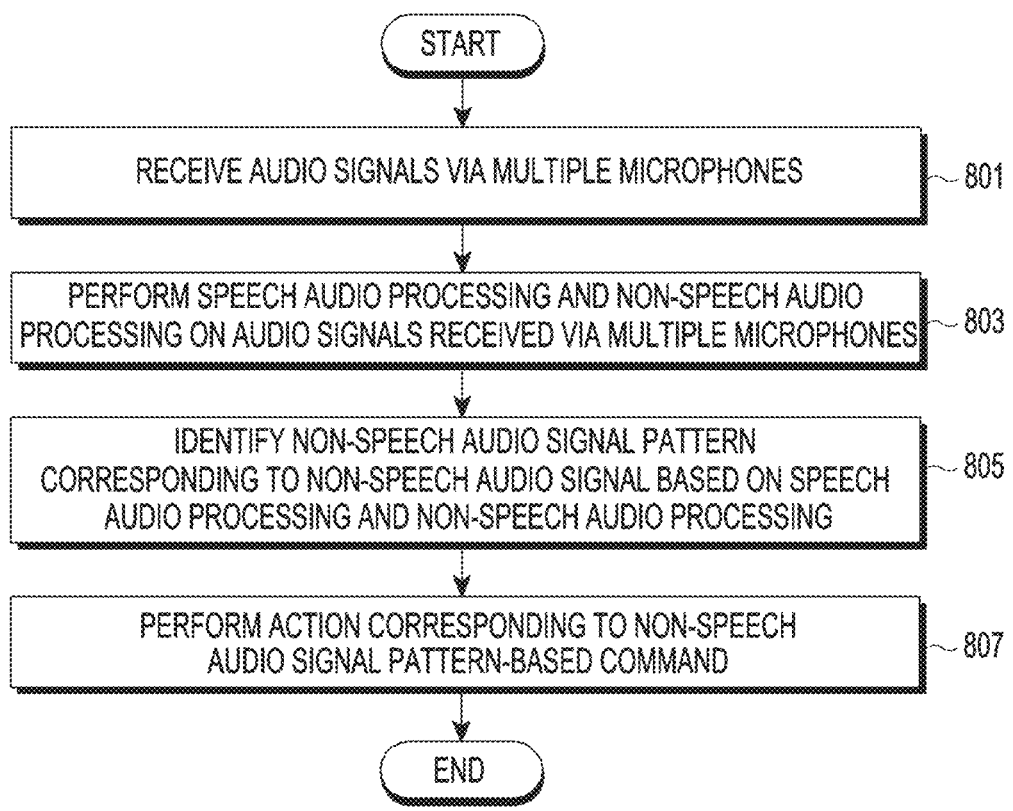
FIG. 8 is a flowchart illustrating control operations using a non-speech audio signal in an electronic device according to an embodiment of the disclosure.

FIG. 8 is a flowchart illustrating control operations using a non-speech audio signal in an electronic device according to an embodiment of the disclosure.

Referring to FIG. 8, according to an embodiment, operations 801 to 807 may be appreciated as performed by a processor (e.g., the processor 306 of FIG. 3 or the processor 406 of FIG. 4, hereinafter, the processor 306 of FIG. 3 is described as an example) of an electronic device (e.g., the user terminal 100 of FIG. 1, the electronic device 2200 of FIG. 2, or the electronic device 3300 of FIG. 3). According to an embodiment, at least one of operations 801 to 807 may be omitted or changed in order or may add other operations.

According to an embodiment, in operation 801, the processor 306 may receive audio signals (speech audio signals or non-speech audio signals) via microphones (e.g., the microphones 304 of FIG. 3).

According to an embodiment, in operation 803, the processor 306 may perform sound audio processing and non-sound audio processing each on the audio signals received via the microphones 304. According to an embodiment, the processor 306 may perform first pre-processing (e.g., first audio processing) on the audio signals received via the microphones 304 and obtain speech audio signals based on the first pre-processed signals and perform speech recognition. According to an embodiment, the processor 306 may perform the first pre-processing to remove noise or echoes caused by the ambient environment from the audio signal and to enhance the signal of the voice frequency band (e.g., the frequency band in which the human voices are distributed) from the audio signal. For example, the processor 306 may perform the first pre-processing to filter the audio signal to extract the voice frequency band signal and amplify the voice frequency band signal. According to an embodiment, the processor 306 may perform second pre-processing (e.g., second audio processing) on the audio signals received via the microphones 304 and obtain non-speech audio signals based on the second pre-processed signals and perform non-speech recognition. According to an embodiment, the processor 306 may perform the second pre-processing to enhance the non-speech audio signal (e.g., the non-speech audio signal pattern when the user performs a physical input to the area indicating where the plurality of microphones 213 are arranged) from the audio signal. For example, the processor 306 may perform the second pre-processing to remove noise or echoes caused by the ambient environment from the audio signal and amplify the non-speech audio signal pattern.

According to an embodiment, in operation 805, the processor 306 may identify the non-speech audio signal pattern based on speech audio processing and non-speech audio processing. According to an embodiment, the processor 306 may detect the start and end of the non-speech audio signal pattern from the second-preprocessed audio signal and compare the non-speech audio signal pattern obtained by the detection of the start and end of the non-speech audio signal pattern with pre-stored non-speech audio signal pattern models to thereby identify at least one matching non-speech audio signal pattern model.

According to an embodiment, in operation 807, the processor 306 may perform an action corresponding to a non-speech audio signal pattern-based command. According to an embodiment, the processor 306 may recognize the command corresponding to the at least one identified non-speech audio signal pattern model based on the commands individually associated with the pre-stored non-speech audio signal pattern models and perform the action corresponding to the recognized command.

Figure 9:
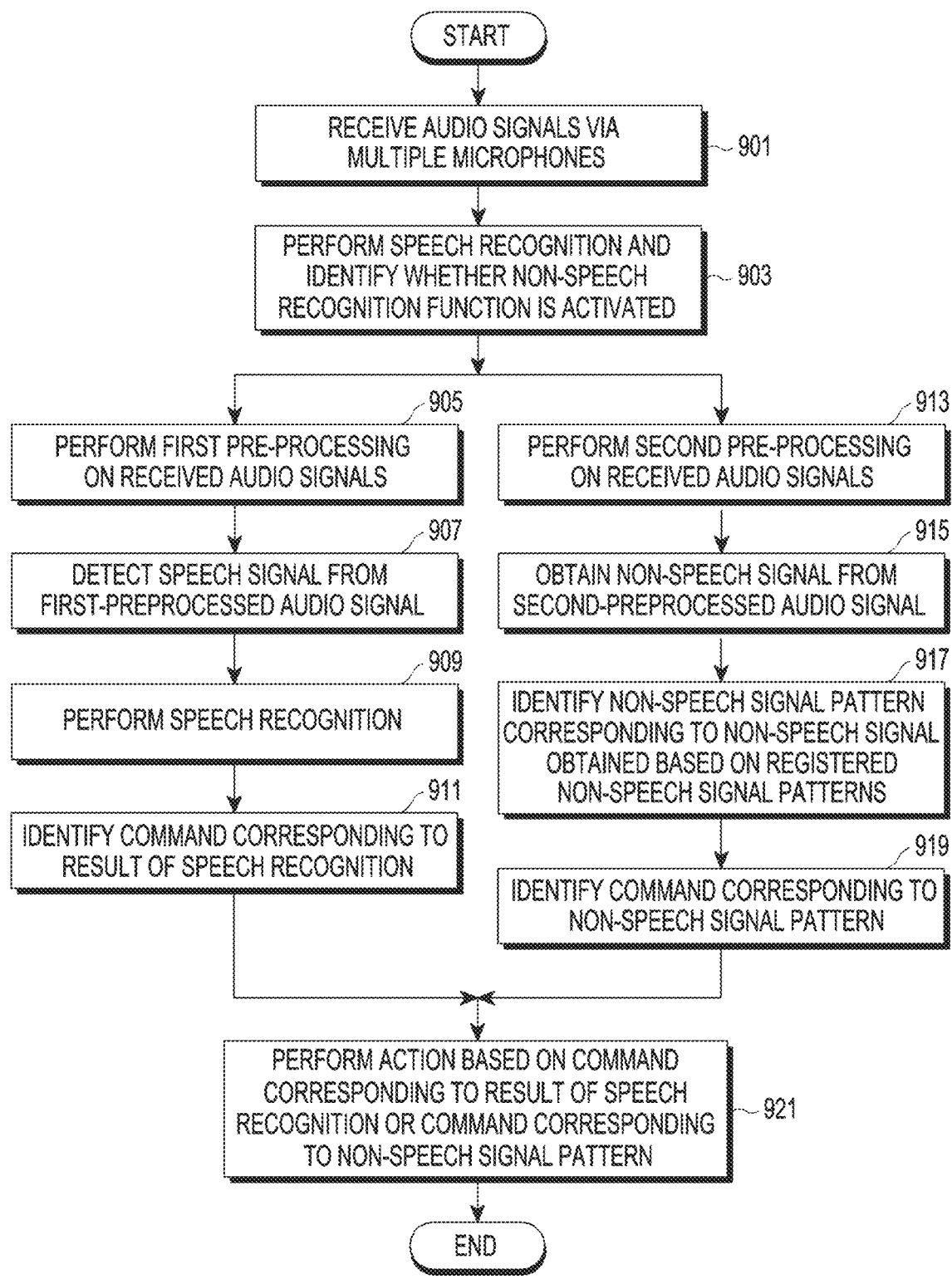
FIG. 9 is a flowchart illustrating operations of performing an action using a speech signal and a non-speech signal in an electronic device according to an embodiment of the disclosure.

FIG. 9 is a flowchart illustrating operations of performing an action using a speech signal and a non-speech signal in an electronic device according to an embodiment of the disclosure.

Referring to FIG. 9, according to an embodiment, operations 901 to 921 may be appreciated as performed by a processor (e.g., the processor 306 of FIG. 3 or the processor 406 of FIG. 4, hereinafter, the processor 306 of FIG. 3 is described as an example) of an electronic device (e.g., the user terminal 100 of FIG. 1, the electronic device 2200 of FIG. 2, or the electronic device 3300 of FIG. 3). According to an embodiment, at least one of operations 901 to 921 may be omitted or changed in order or other operations may be added.

According to an embodiment, in operation 901, the processor 306 may receive audio signals (speech audio signals or non-speech audio signals) via microphones (e.g., the microphones 304 of FIG. 3).

According to an embodiment, in operation 903, the processor 306 may identify whether the speech recognition function and non-speech recognition function have been activated. According to an embodiment, each of the speech recognition function and non-speech recognition function may be selectively activated or deactivated. According to an embodiment, the processor 306 may activate the speech recognition function (speech recognition application or intelligent agent) based on a wakeup input signal or key input signal by a user utterance. According to an embodiment, the processor 306 may keep the non-speech recognition function active all the time or may activate the non-speech recognition function under a specific condition (e.g., when speech recognition is too troubled due to, e.g., music play or other ambient noise) or by the user's selection. According to an embodiment, the processor 306 may perform operations 905 to 911 in the activated state of the speech recognition function and may perform operations 913 to 919 in the activated state of the non-speech recognition function. Although in the following description, operations 905 to 919 all are performed with both the speech recognition function and the non-speech recognition function activated, operations 913 to 919 may not be performed when the speech recognition function alone is in the activated state, and operations 905 to 911 may not be performed when the non-speech recognition function alone is in the activated state. When both the speech recognition function and the signal non-transmission region function are in the deactivated state, the received audio signal may be disregarded.

According to an embodiment, in operation 905, the processor 306 may perform first pre-processing on the audio signals received via microphones (e.g., the microphones 304 of FIG. 3). According to an embodiment, the processor 306 may filter the received audio signal via the first pre-processing unit (e.g., the first pre-processing unit 432 of FIG. 4) to enhance a signal of a voice frequency band (e.g., the frequency band in which human speeches are distributed) from the audio signal to thereby extract the voice frequency band of speech audio signal or amplify the voice frequency band of speech audio signal. For example, the processor 306 may perform AEC, NS, EPD, or/and AGC operation on the received audio signal via the first pre-processing unit 432.

According to an embodiment, in operation 907, the processor 306 may detect the speech signal from the first pre-processed audio signal.

According to an embodiment, in operation 909, the processor 306 may perform speech recognition using the detected speech signal. According to an embodiment, the processor 306 may perform speech recognition using an ASR module (e.g., the speech recognition module 434 of FIG. 4).

According to an embodiment, in operation 911, the processor 306 may identify the command corresponding to the result of speech recognition. According to an embodiment, the processor 306 may obtain the information (data or command) corresponding to the speech audio signal from inside of the electronic device 3300 or an external server using the ASR module (e.g., the speech recognition module 434 of FIG. 4). According to an embodiment, the ASR module may include an intelligent agent.

According to an embodiment, in operation 913, the processor 306 may perform second pre-processing on the audio signals received via microphones (e.g., the microphones 304 of FIG. 3). According to an embodiment, the processor 306 may perform the second pre-processing to enhance the non-speech audio signal (e.g., the non-speech audio signal pattern when the user performs a physical input to the area indicating where the plurality of microphones 213 are arranged) from the audio signal. For example, the processor 306 may perform the second pre-processing to remove noise or echoes caused by the ambient environment from the audio signal and amplify the non-speech audio signal pattern.

According to an embodiment, in operation 915, the processor 306 may obtain the non-speech audio signal from the second-preprocessed audio signal. According to an embodiment, the processor 306 may detect the start and end of the non-speech audio signal pattern from the second-preprocessed audio signal and obtain the non-speech audio signal (or non-speech audio signal pattern) by the detection of the start and end of the non-speech audio signal pattern.

According to an embodiment, in operation 917, the processor 306 may identify the non-speech audio signal pattern corresponding to the obtained non-speech signal based on pre-registered non-speech signal patterns. According to an embodiment, the processor 306 may compare the obtained non-speech audio signal pattern with pre-stored non-speech audio signal pattern models to thereby identify at least one matching non-speech audio signal pattern model.

According to an embodiment, in operation 919, the processor 306 may identify a non-speech audio signal pattern-based command. According to an embodiment, the processor 306 may recognize the command corresponding to the at least one identified non-speech audio signal pattern model based on the commands individually associated with the pre-stored non-speech audio signal pattern models.

According to an embodiment, in operation 921, the processor 306 may perform an action based on the command corresponding to the result of speech recognition or the command corresponding to the non-speech signal pattern. According to an embodiment, the processor 306 may execute (or perform) an application (or function) or perform the operation of the application (or function) according to a speech recognition-based command or non-speech audio signal pattern-based command, using the action module 450 (or the execution manager module).

Figure 10:
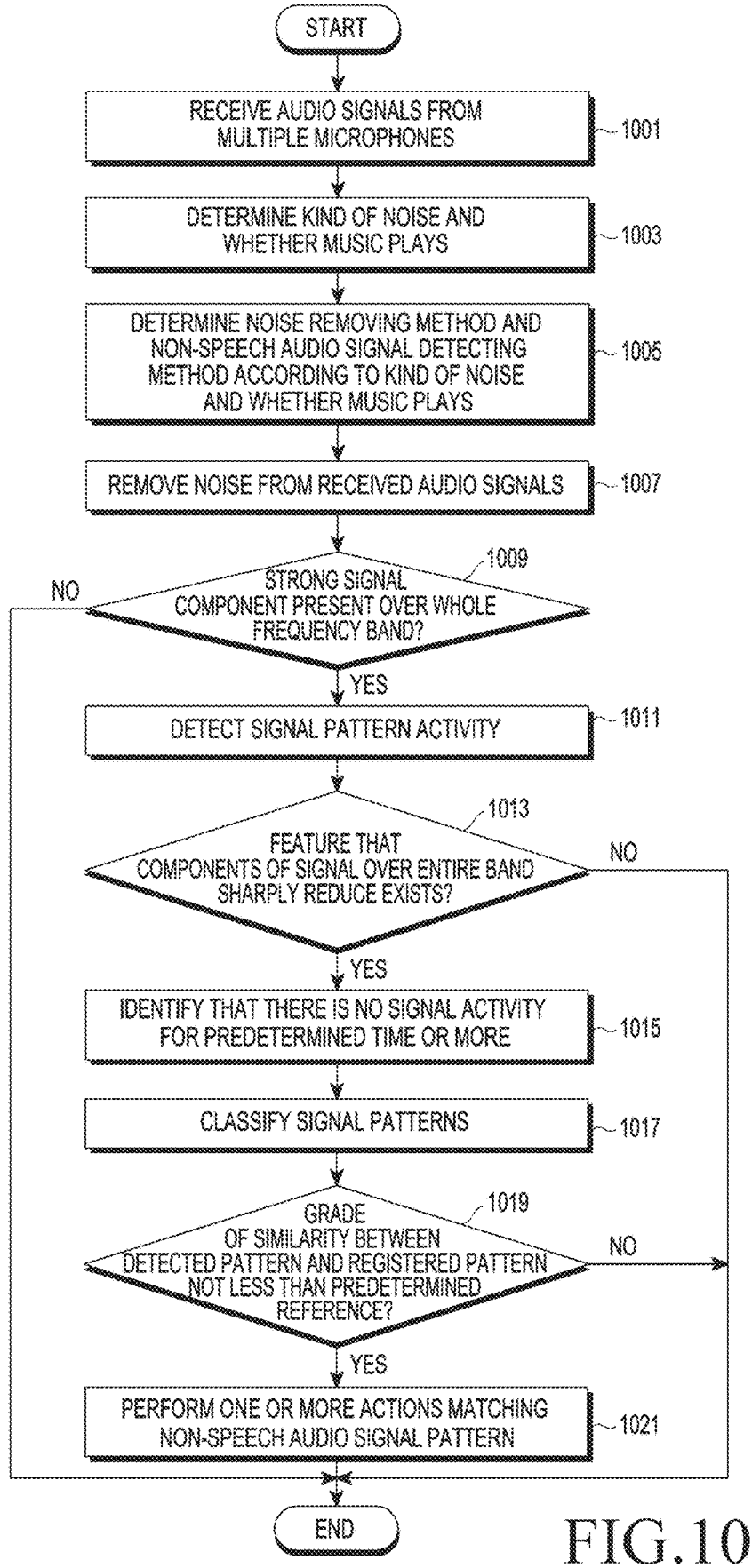
FIG. 10 is a flowchart illustrating operations of performing an action using a non-speech signal in an electronic device according to an embodiment of the disclosure.

FIG. 10 is a flowchart illustrating operations of performing an action using a non-speech signal in an electronic device according to an embodiment of the disclosure.

Referring to FIG. 10, according to an embodiment, operations 1001 to 1021 may be appreciated as performed by a processor (e.g., the processor 306 of FIG. 3 or the processor 406 of FIG. 4, hereinafter, the processor 306 of FIG. 3 is described as an example) of an electronic device (e.g., the user terminal 100 of FIG. 1, the electronic device 2200 of FIG. 2, or the electronic device 3300 of FIG. 3). According to an embodiment, at least one of operations 1001 to 1021 may be omitted or changed in order or other operations may be added.

According to an embodiment, in operation 1001, the processor 306 may receive audio signals (speech audio signals or non-speech audio signals) via microphones (e.g., the microphones 304 of FIG. 3).

According to an embodiment, in operation 1003, the processor 306 may determine the kind of noise and whether music plays. According to an embodiment, the processor 306 may identify whether there is a sound signal being currently output via the speaker and, if any, its kind (whether it is music) based on the reference signal and compare the sound signal being currently output with the audio signals received from the microphones 304 to thereby determine the current noise level (e.g., noise level or amplitude) of the surroundings. For example, the noise estimation/determination unit 505 may identify that the current noise level is any one of a plurality of levels (e.g., a low level, a mid level, or a high level) using a predesignated noise threshold.

According to an embodiment, in operation 1005, the processor 306 may determine a method for removing noise and a method for detecting the non-speech audio signal according to the kind of noise and whether music plays. According to an embodiment, the processor 306 may determine whether to refrain from pre-processing the received audio signal, remove echoes only or noise only or echoes and noise both depending on the kind of noise and whether music plays and determine to selectively use at least one pattern detection unit and at least one pattern analysis detection unit among the plurality of pattern activity detection units and the plurality of pattern analysis detection units depending on the kind of noise and whether music plays.

According to an embodiment, in operation 1007, the processor 306 may remove noise from the received audio signal. According to an embodiment, the processor 306 may remove noise from the received audio signal using the noise removal method determined depending on the kind of noise and whether music plays.

According to an embodiment, in operation 1009, the processor 306 may determine whether the noise-removed audio signal contains a strong signal component over the entire frequency band. According to an embodiment, the processor 306 may determine whether the noise-removed audio signal includes a portion which is distributed in the whole frequency (e.g., audible frequency) band or a band broader than the voice frequency band and in which the amplitude of a non-speech audio signal component has sharply increased.

According to an embodiment, in operation 1011, the processor 306 may detect the non-speech audio signal pattern activity if the noise-removed audio signal includes a strong signal component over the whole frequency band. According to an embodiment, if the component of the noise-removed audio signal is distributed in a broader band than the voice frequency band or the whole band of the frequency (e.g., audible frequency) and includes a strong signal component, the processor 306 may detect the start of the received audio signal as the start of the non-speech audio signal pattern.

According to an embodiment, in operation 1013, the processor 306 may identify whether such feature occurs in which the signal components of the whole band sharply reduce. According to an embodiment, unless the feature that the signal components of the whole band are all reduced occurs, the processor 306 may terminate the detection of the non-speech audio signal pattern. According to an embodiment, the processor 306 may repeatedly perform operations 1009 to 1013 under a predetermined condition to precisely detect the non-speech audio signal pattern.

According to an embodiment, in operation 1015, if such feature occurs in which the signal components of the whole band sharply reduce, the processor 306 may identify that there is no signal activity for a predetermined time or more. According to an embodiment, if all of the signal components of the whole band are sharply reduced after the start of the non-speech audio signal pattern is detected, the processor 306 may identify that the non-speech audio signal pattern is not received and detect the time when the non-speech audio signal pattern is not received as the end of the non-speech audio signal pattern. According to an embodiment, in a case where the non-speech audio signal pattern is continuously received, if a designated time (e.g., the maximum length of the non-speech audio signal pattern) arrives, the processor 306 may detect the designated time as the end of the non-speech audio signal pattern.

According to an embodiment, in operation 1017, upon identifying that there is no signal activity for a predetermined time or more, the processor 306 may classify signal patterns. According to an embodiment, the processor 306 may identify what kind the obtained non-speech audio signal pattern is of by the detection of the start and end of the non-speech audio signal pattern. For example, the processor 306 may identify whether the kind of the obtained non-speech audio signal pattern is a kind registered upon manufacture of the electronic device 3300 or a kind registered by the user based on learning.

According to an embodiment, in operation 1019, the processor 306 determines whether the grade of similarity between the detected pattern and the registered pattern is a predetermined reference or more. According to an embodiment, the processor 306 may compare the non-speech audio signal pattern obtained by the detection of the start and end of the audio signal pattern with the non-speech audio signal pattern models stored in the acoustic pattern model storage unit (e.g., 67 of FIG. 6), thereby obtaining at least one matching non-speech audio signal pattern model. For example, the processor 306 may compare the non-speech audio signal pattern models stored in the acoustic pattern model storage unit with the non-speech audio signal pattern obtained by the detection of the start and end of the non-speech audio signal pattern to thereby detect a similarity (degree of similarity) and identify at least one non-speech audio signal pattern model for which the similarity is not less than a predetermined threshold.

According to an embodiment, in operation 1021, the processor 306 may perform one or more actions that match the non-speech audio signal pattern. According to an embodiment, the processor 306 may recognize the command corresponding to the at least one identified non-speech audio signal pattern model based on the commands individually associated with the non-speech audio signal pattern models stored in the user command model storage unit (e.g., 69 of FIG. 6) and perform at least one or more actions corresponding to the recognized command. For example, the processor 306 may identify at least one non-speech audio signal pattern model having a predetermined reference of similarity (or degree of similarity) or more with the non-speech audio signal pattern models stored in the user command model storage unit (e.g., 69 of FIG. 6) and recognize the command corresponding to at least one identified non-speech audio signal pattern model.

FIGS. 11A, 11B, 11C, and 11D are views illustrating example non-speech audio signal patterns received via a plurality of microphones of an electronic device according to various embodiments of the disclosure.

Figure 11A:
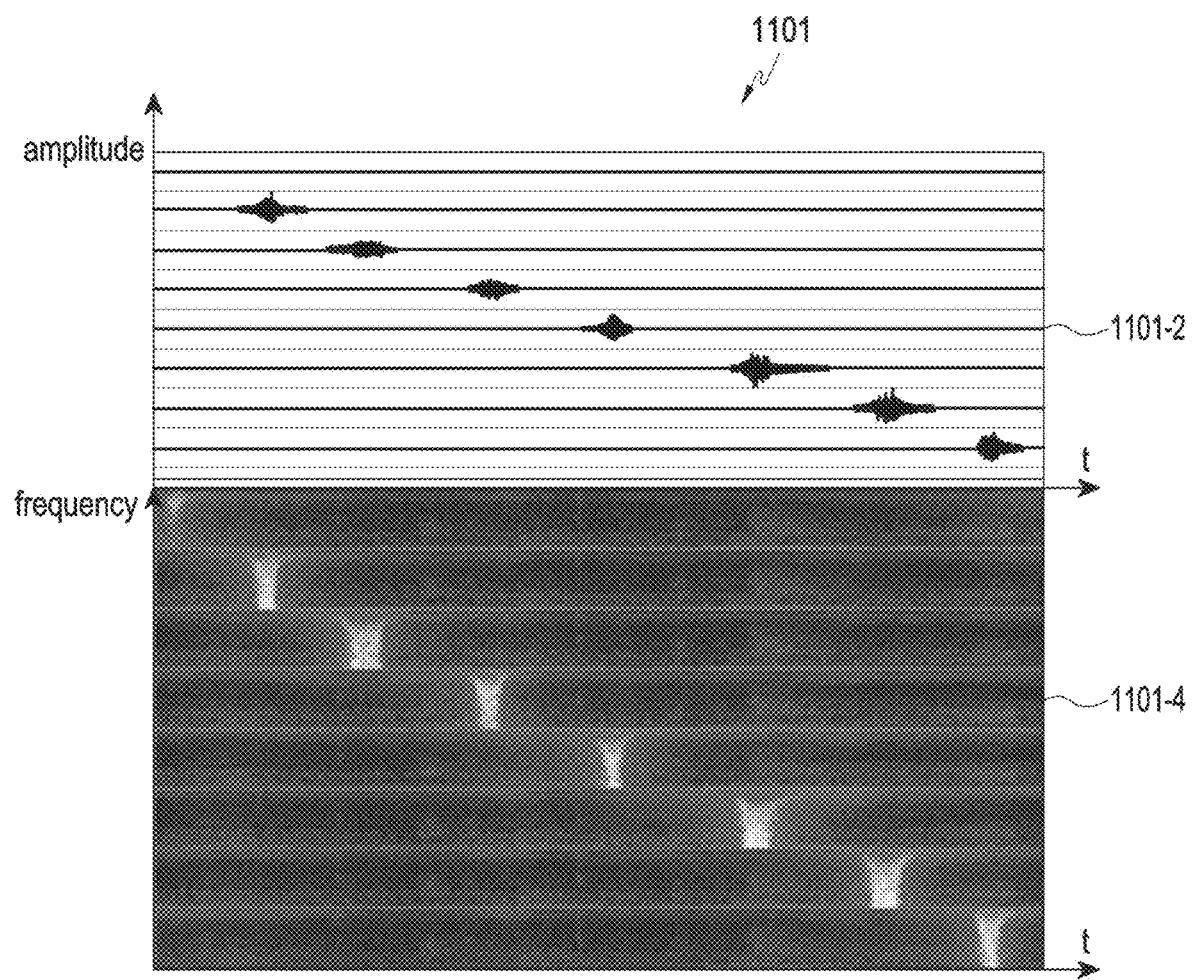
FIGS. 11A, 11B, 11C, and 11D are views illustrating example non-speech audio signal patterns received via a plurality of microphones of an electronic device according to various embodiments of the disclosure.

Referring to FIG. 11A, if a sweeping input to draw along a circumference is performed on eight microphones by the user, with the eight microphones arranged along the circumference at predetermined intervals on one surface (e.g., the top surface 2210 of FIG. 2) of an electronic device (e.g., the user terminal 100 of FIG. 1, the electronic device 2200 of FIG. 2, or the electronic device 3300 of FIG. 3), the electronic device 3300 may receive the non-speech audio signal according to the sweeping input via the microphones and obtain a non-speech audio signal pattern 1101 such as a first pattern 1101-2 or a second pattern 1101-4. For example, the x axis of the first pattern 1101-2 may denote the time, and the y axis may denote the amplitude of the audio signal. The x axis of the second pattern 1101-4 may denote the time, they axis may denote the frequency, and the area by the time and frequency may denote the strength of the spectral component. If a sweeping input to draw along the circumference is performed by the user on the eight microphones as shown in FIG. 11A, signals with time delay intervals from the first microphone to the eighth microphone may be received, and the non-speech audio signal pattern may be obtained.

Figure 11B:
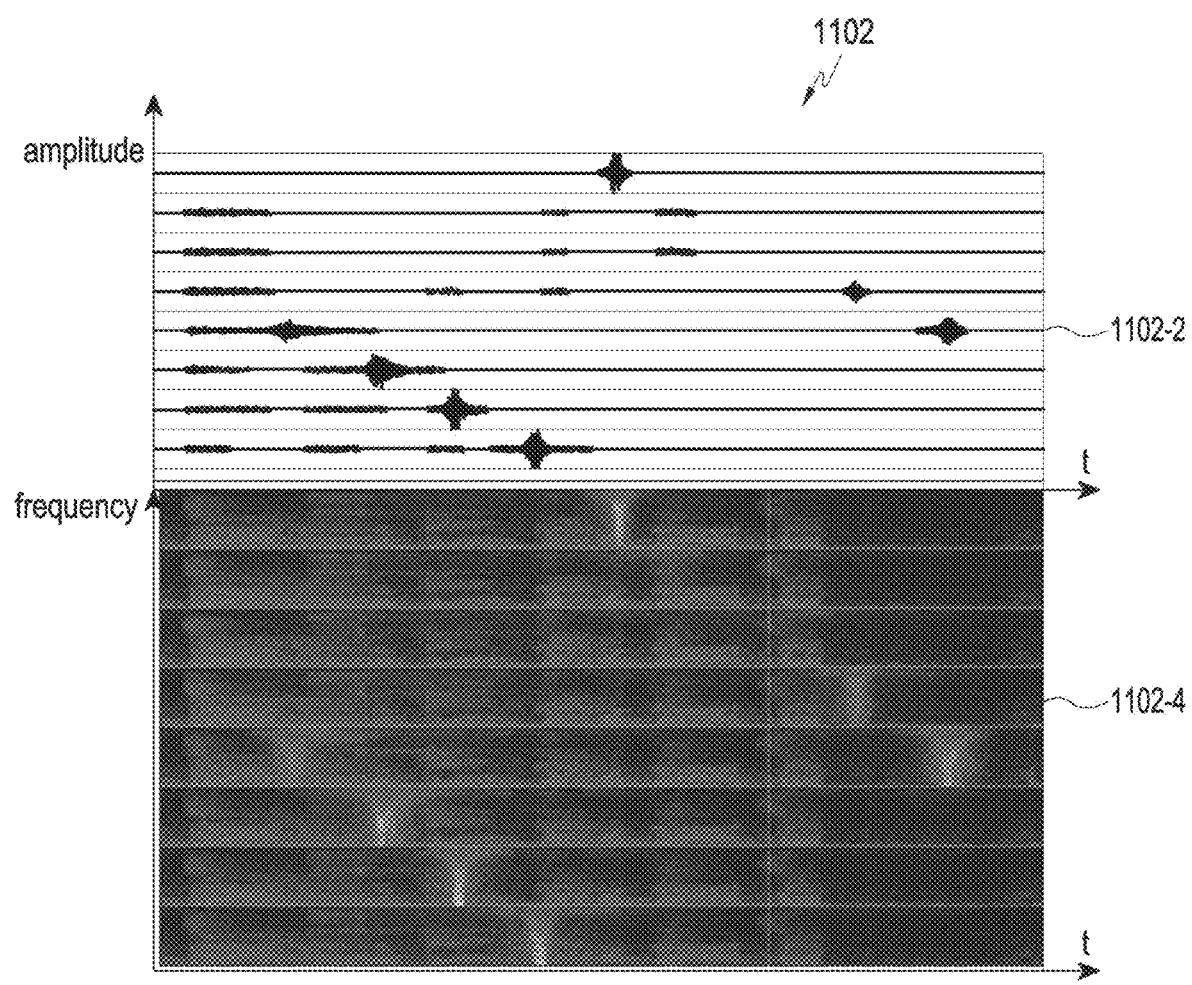

Referring to FIG. 11B, if an input (e.g., the first input) other than a sweeping input to draw along a circumference is performed on eight microphones by the user, with the eight microphones arranged along the circumference at predetermined intervals on one surface (e.g., the top surface 2210 of FIG. 2) of the electronic device, the electronic device 3300 may receive the non-speech audio signal according to the other input via the microphones and obtain a non-speech audio signal pattern 1102 such as a third pattern 1102-2 or a fourth pattern 1102-4.

Figure 11C:
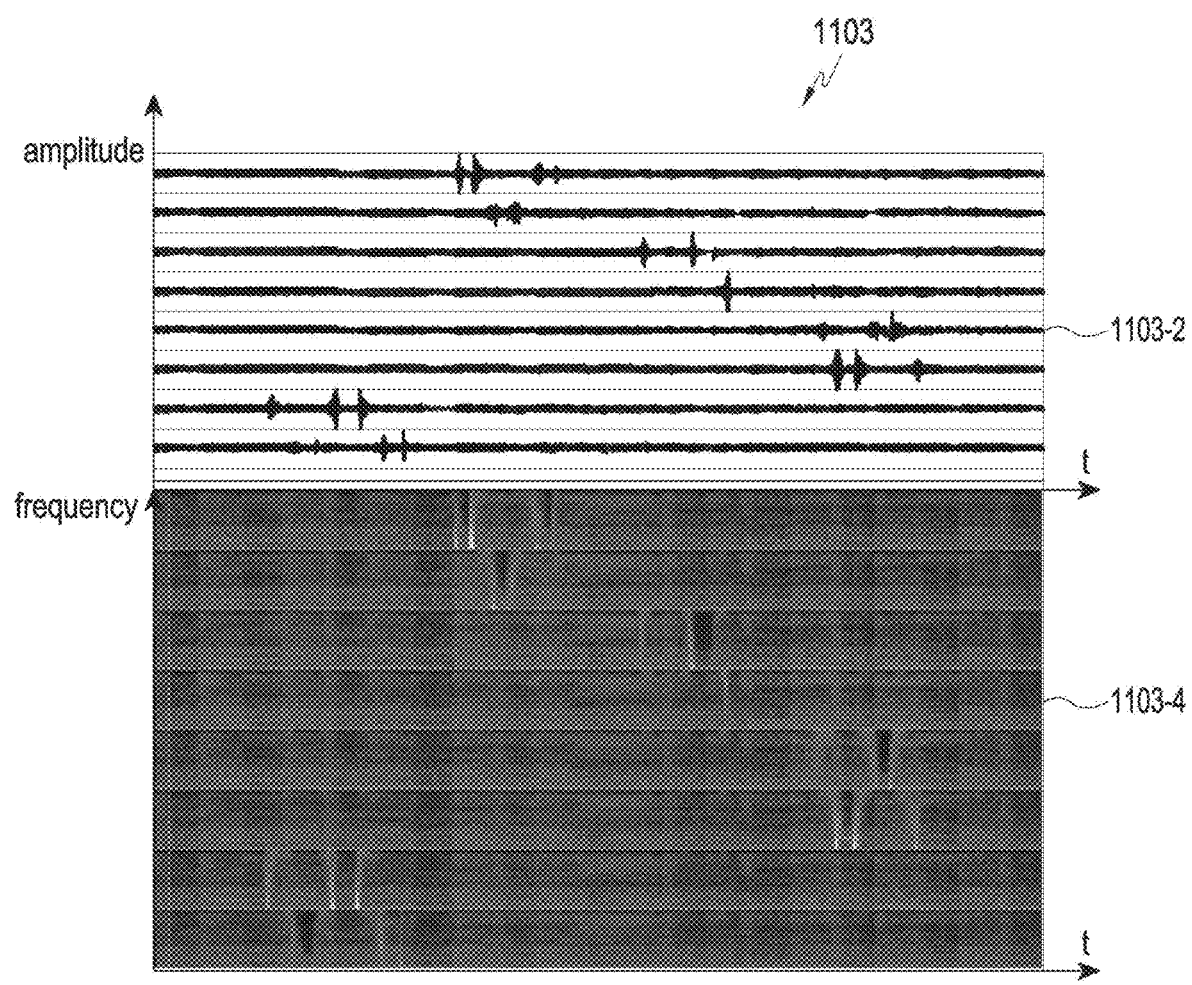

Referring to FIG. 11C, if a second input is performed by the user on the eight microphones, with music playing, the electronic device 3300 may receive the non-speech audio signal according to the second input, including part of the music play sound, via the microphones and obtain a non-speech audio signal pattern 1103 such as a fifth pattern 1103-2 or a sixth pattern 1103-4.

Figure 11D:
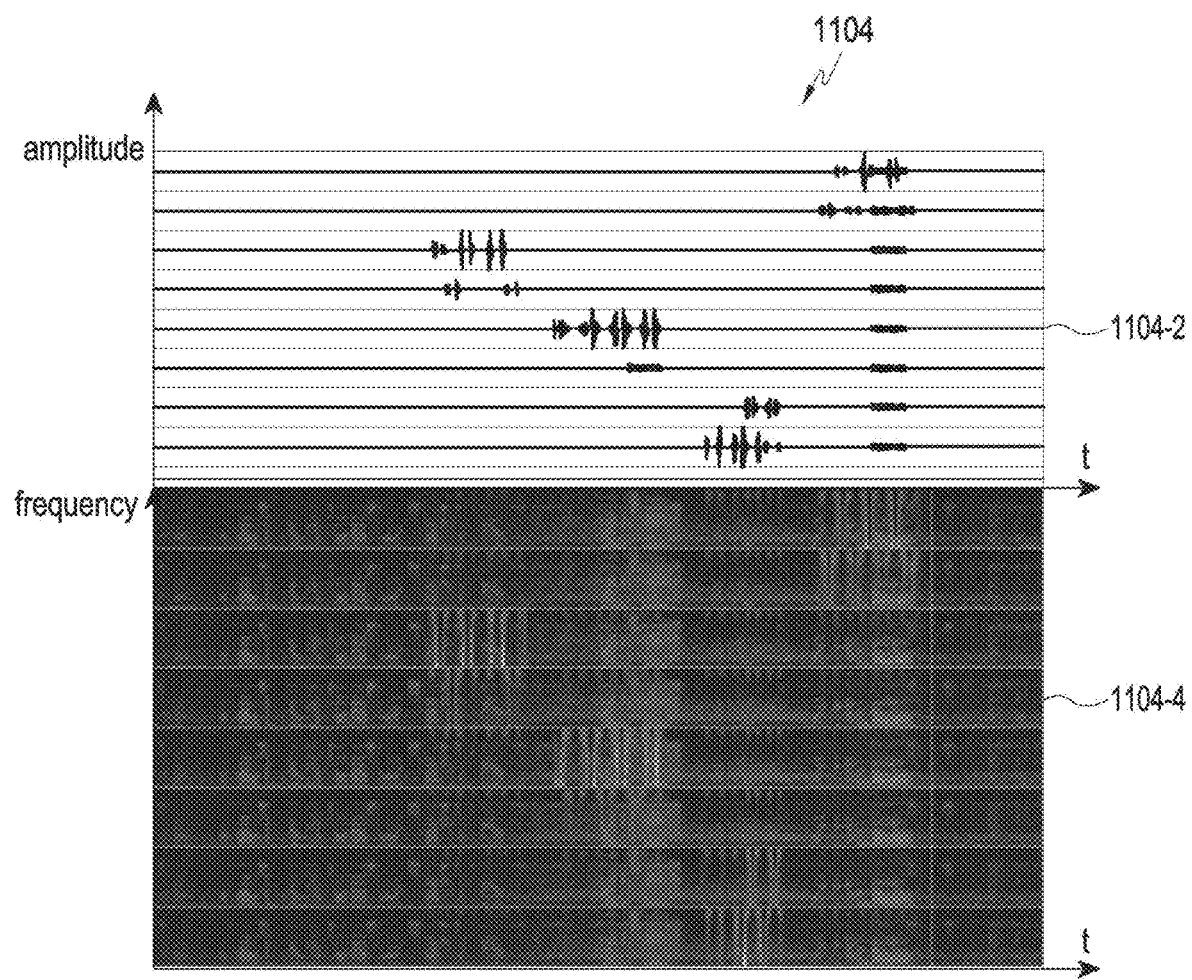

Referring to FIG. 11D, if a third input is performed by the user on the eight microphones, with noise around, the electronic device 3300 may receive the non-speech audio signal according to the third input, including noise, via the microphones and obtain a non-speech audio signal pattern 1104 such as a seventh pattern 1104-2 or an eighth pattern 1104-4. According to an embodiment, the processor 306 may detect each of various non-speech signal patterns 1101 to 1104 as shown in FIGS. 11A to 11D via non-speech recognition.

Figure 12:
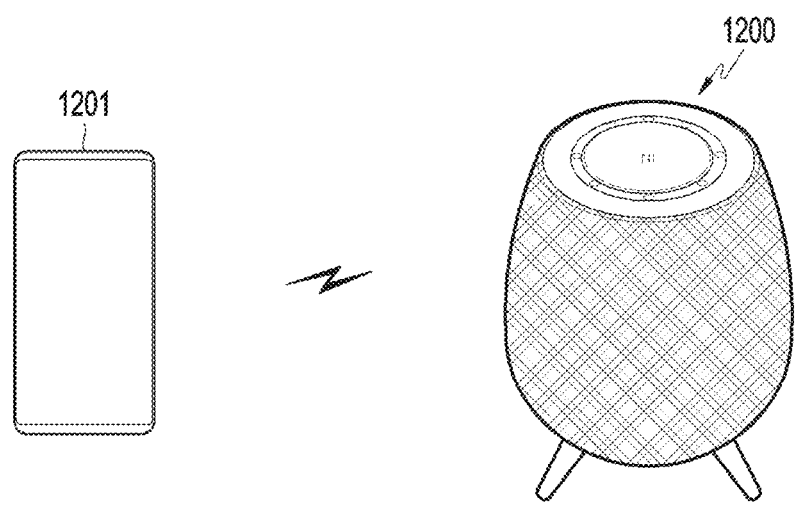
FIG. 12 is a perspective view illustrating an external electronic device interacting with an electronic device according to an embodiment of the disclosure.

FIG. 12 is a perspective view illustrating an external electronic device interacting with an electronic device according to an embodiment of the disclosure.

Referring to FIG. 12, an electronic device 1200 (e.g., the user terminal 100 of FIG. 1, the electronic device 2200 of FIG. 2, or the electronic device 3300 of FIG. 3) may interwork with an external electronic device 1201 (e.g., a smartphone) via communication. For example, the electronic device 1200 may register or store, in the acoustic pattern model storage unit (e.g., 67 of FIG. 6), various non-speech audio signal pattern models obtained as the user performs a physical input to the microphones 304 or the area (e.g., 215 of FIG. 2) indicating the portion where the microphones 304 are arranged via communication with the external electronic device 1201. According to an embodiment, the external electronic device 1201 may provide a user interface (UI) (e.g., screen display or voice guidance) used to register or store various non-speech audio signal pattern models.

Figure 13:
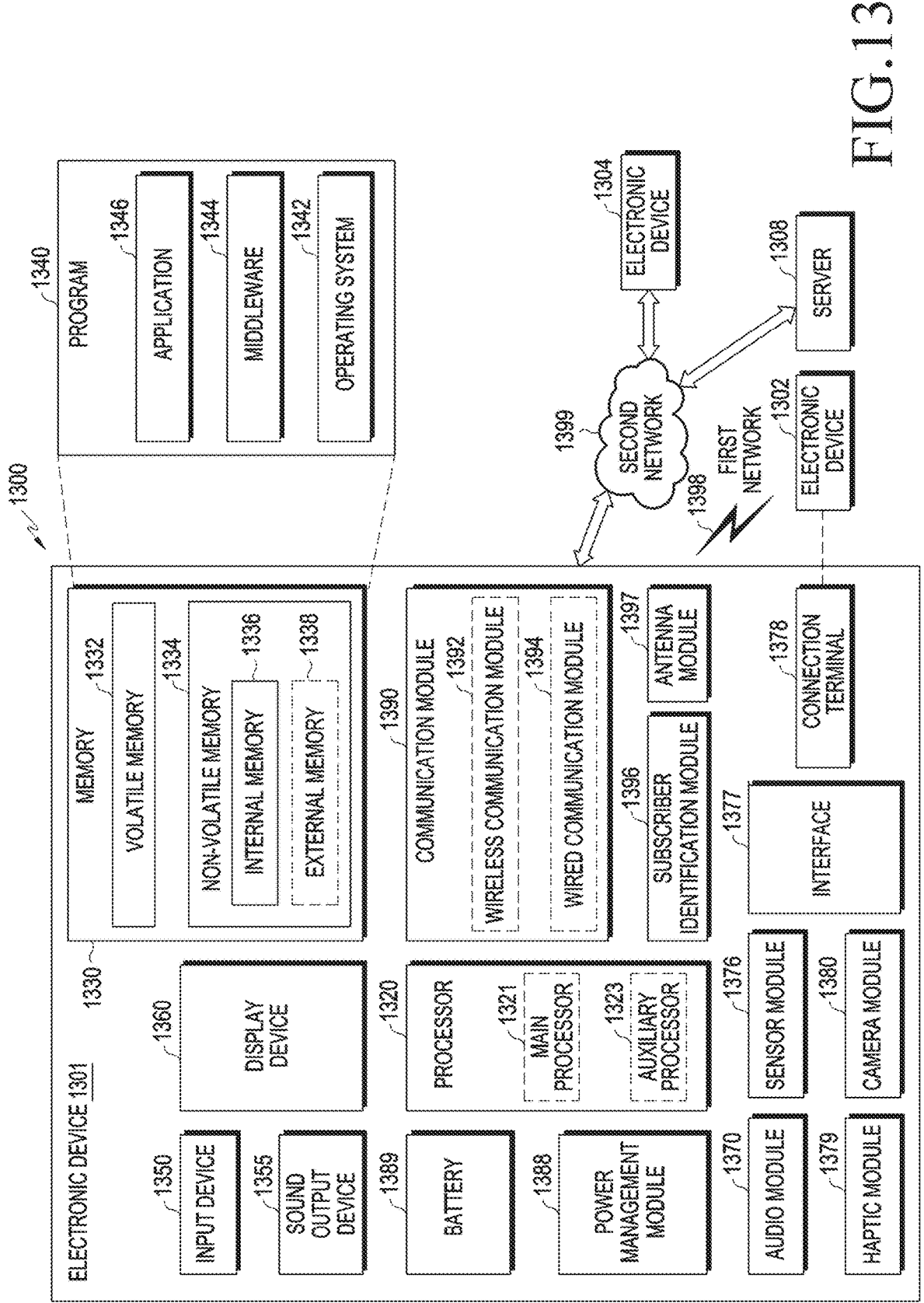
FIG. 13 is a block diagram illustrating an electronic device in a network environment according to an embodiment of the disclosure.

FIG. 13 is a block diagram illustrating an electronic device in a network environment according to an embodiment of the disclosure.

Referring to FIG. 13, an electronic device 1301 (e.g., the electronic device 1200 of FIG. 12) in a network environment 1300 may communicate with an electronic device 1302 via a first network 1398 (e.g., a short-range wireless communication network), or an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include at least one processor 1320, memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) 1396, or an antenna module 1397. In some embodiments, at least one (e.g., the display device 1360 or the camera module 1380) of the components may be omitted from the electronic device 1301, or one or more other components may be added in the electronic device 1301. In some embodiments, some of the components may be implemented as single integrated circuitry. For example, the sensor module 1376 (e.g., a fingerprint sensor, an iris sensor, or an illuminance sensor) may be implemented as embedded in the display device 1360 (e.g., a display).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may load a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 123.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334. The non-volatile memory may include an internal memory 1336 or an external memory 1338.

The program 1340 may be stored in the memory 1330 as software, and may include, for example, an operating system (OS) 1342, middleware 1344, or an application 1346.

The input device 1350 may receive a command or data to be used by other components (e.g., the processor 1320) of the electronic device 1301, from the outside (e.g., a user) of the electronic device 1301. The input device 1350 may include, for example, a microphone, a mouse, a keyboard, or a digital pen (e.g., a stylus pen).

The sound output device 1355 may output sound signals to the outside of the electronic device 1301. The sound output device 1355 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 1301. The display device 1360 may include, for example, a display, a hologram device, or a projector and control circuitry to control a corresponding one of the display, hologram device, and projector. According to an embodiment, the display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. According to an embodiment, the audio module 1370 may obtain the sound via the input device 1350, or output the sound via the sound output device 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 101, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or motion) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture an image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 1397 may include a plurality of antennas. In this case, at least one antenna appropriate for a communication scheme used in a communication network, such as the first network 1398 or the second network 1399, may be selected from the plurality of antennas by, e.g., the communication module 1390. The signal or the power may then be transmitted or received between the communication module 1390 and the external electronic device via the selected at least one antenna. According to an embodiment, other parts (e.g., radio frequency integrated circuit (RFIC)) than the radiator may be further formed as part of the antenna module 1397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 104 via the server 1308 coupled with the second network 1399. Each of the electronic devices 1302 and 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

Figure 14A:
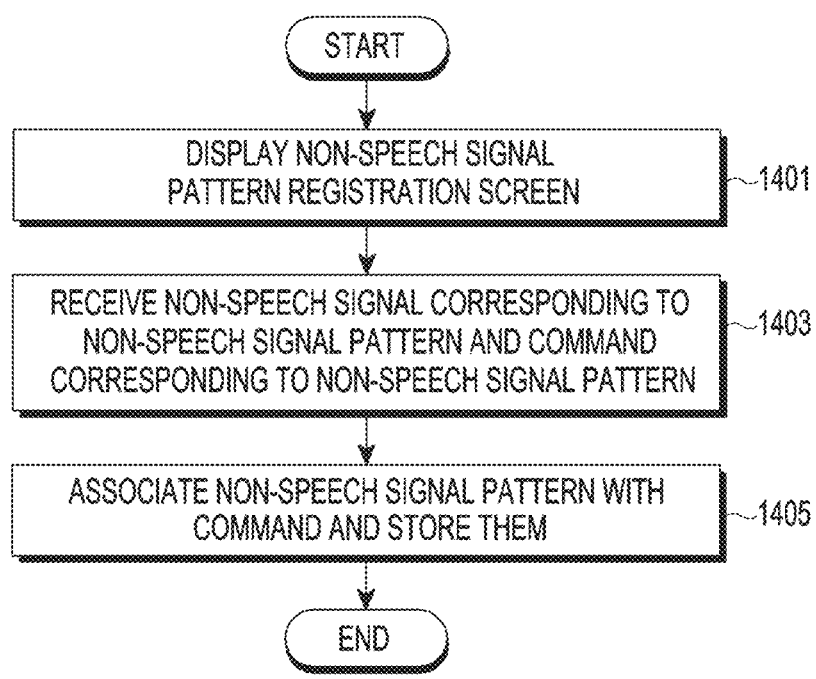
FIG. 14A is a flowchart illustrating operations of registering a non-speech signal pattern using a non-speech signal pattern registration screen in an electronic device according to an embodiment of the disclosure.

FIG. 14A is a flowchart illustrating operations of registering a non-speech signal pattern using a non-speech signal pattern registration screen in an electronic device according to an embodiment of the disclosure.

Referring to FIG. 14A, according to an embodiment, operations 1401 to 1405 may be appreciated as performed by a processor (e.g., the processor 1320 of FIG. 13) of an electronic device (e.g., the external electronic device 1201 of FIG. 12 or the electronic device 1301 of FIG. 13). According to an embodiment, at least one of operations 1401 to 1405 may be omitted or changed in order or other operations may be added.

According to an embodiment, in operation 1401, the processor 1320 may display a non-speech audio signal pattern registration screen. According to an embodiment, the processor 1320 may perform communication with an electronic device (e.g., the user terminal 100 of FIG. 1, the electronic device 2200 of FIG. 2, the electronic device 3300 of FIG. 3, or the electronic device 1200 of FIG. 12) via the communication module 1390 and connect to the electronic device and, while connected with the electronic device 1200, the processor 1320 may display a screen for registering the non-speech audio signal pattern in the electronic device 1200, via the development device 1360.

According to an embodiment, in operation 1403, the processor 1320 may receive non-speech signal pattern information and receive the command corresponding to the non-speech signal pattern. For example, the processor 1320 may receive, from the electronic device 1200, the non-speech signal pattern information (e.g., the non-speech signal pattern model) obtained from the non-speech signal received according to a physical input to the plurality of microphones in the electronic device 1200 by the user and receive the command corresponding to the non-speech signal pattern information from the user.

According to an embodiment, in operation 1405, the processor 1320 may associate the non-speech signal pattern with the command and store (or register) them. For example, the processor 1320 may transmit a command for associating the non-speech signal pattern with the command and storing (or registering) them to the electronic device 1200 so that the non-speech signal pattern and the command are associated and stored (or registered) in the memory of the electronic device 1200. The electronic device 1200 may store the non-speech signal pattern in the acoustic pattern model storage unit and use the same.

Figure 14B:
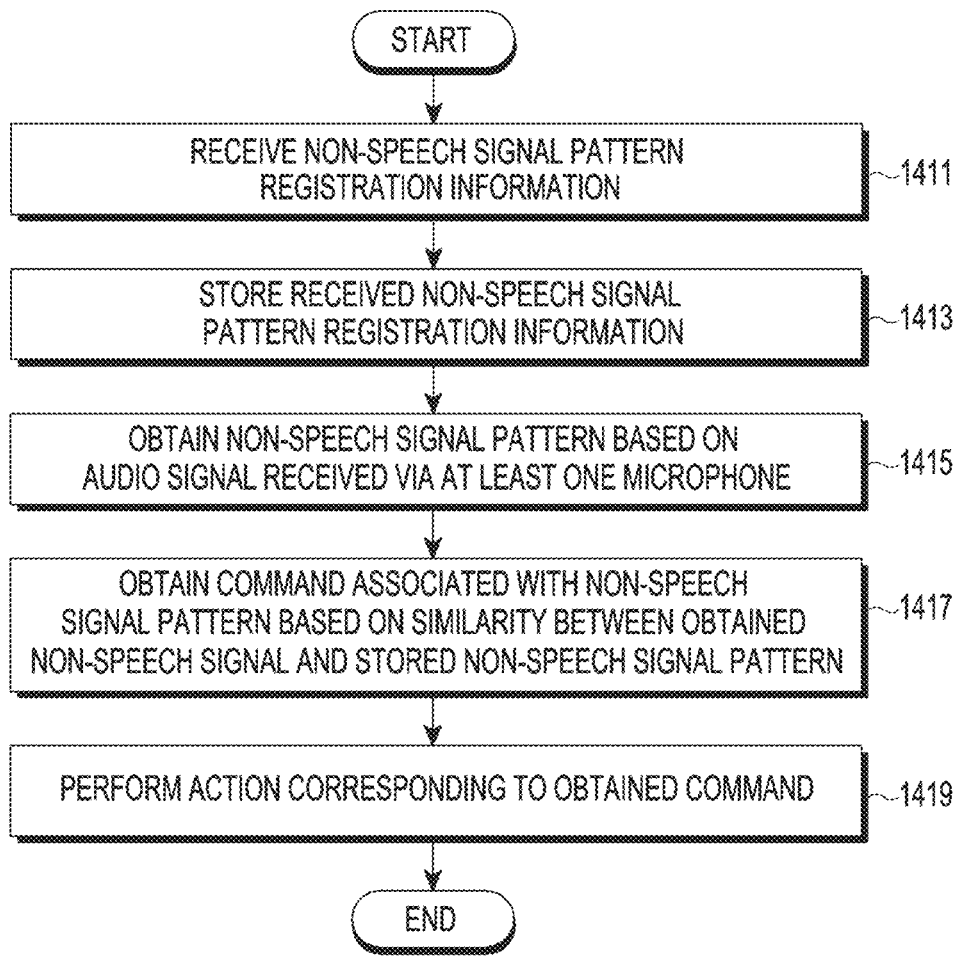
FIG. 14B is a flowchart illustrating operations of registering and using a non-speech signal pattern via communication in an electronic device according to an embodiment of the disclosure.

FIG. 14B is a flowchart illustrating operations of registering and using a non-speech signal pattern via communication in an electronic device according to an embodiment of the disclosure.

Referring to FIG. 14B, according to an embodiment, operations 1411 to 1419 may be appreciated as performed by a processor (e.g., the processor 1320 of FIG. 13) of an electronic device (e.g., the user terminal 100 of FIG. 1, the electronic device 2200 of FIG. 2, the electronic device 3300 of FIG. 3, the electronic device 1200 of FIG. 12, or the electronic device 1301 of FIG. 13). According to an embodiment, at least one of operations 1411 to 1419 may be omitted or changed in order or may add other operations.

According to an embodiment, in operation 1411, the processor 1320 may receive non-speech signal pattern registration information input from an external electronic device (e.g., the external electronic device 1201 of FIG. 12 or another AI speaker) and stored. According to an embodiment, the processor 1320 may perform communication with the external electronic device (e.g., the external electronic device 1201 of FIG. 12 or other AI speaker) via the communication module 1390 and connect to the external electronic device and, while connected with the external electronic device, receive the non-speech signal pattern registration information.

According to an embodiment, in operation 1413, the processor 1320 may store the received non-speech signal pattern registration information. The non-speech signal pattern registration information may include the non-speech signal pattern and the command corresponding to the non-speech signal pattern. For example, the non-speech signal pattern may include non-speech signal pattern information (e.g., the non-speech signal pattern model) obtained from the non-speech signal received according to a physical input on the plurality of microphones by the user, and the command corresponding to the non-speech signal pattern information may be a command that may be executed (or identified) by the processor 1320.

According to an embodiment, in operation 1415, the processor 1320 may obtain the non-speech signal pattern based on the audio signal received via the input device 1350 (e.g., at least one microphone). The method of obtaining the non-speech signal pattern may include at least some of operations 1001 to 1017 of FIG. 10.

According to an embodiment, in operation 1417, the processor 1320 may obtain the command associated with the obtained non-speech signal pattern based on the similarity between the obtained non-speech signal pattern and the stored (or registered) non-speech signal pattern.

According to an embodiment, in operation 1419, the processor 1320 may perform at least one action corresponding to the obtained command.

Figure 15:
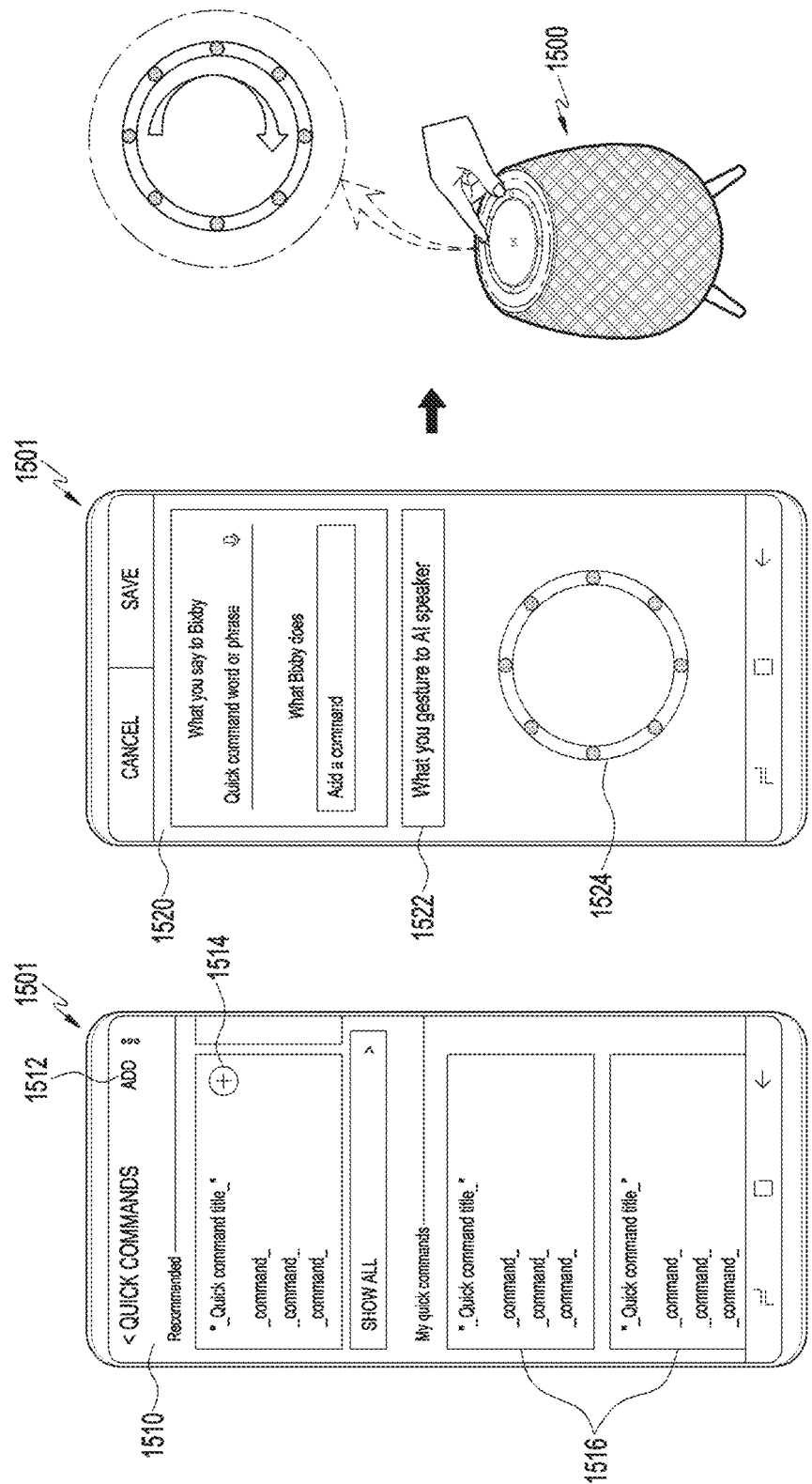
FIG. 15 is views illustrating an example screen of registering a non-speech signal pattern used in an electronic device according to an embodiment of the disclosure.

FIG. 15 is views illustrating an example screen of registering a non-speech signal pattern used in an electronic device according to an embodiment of the disclosure.

Referring to FIG. 15, an external electronic device 1501 (e.g., the external electronic device 1201 of FIG. 12) may display a screen 1510 (e.g., a QUICK COMMANDS screen) for registering the non-speech signal pattern associated with an electronic device 1500 (e.g., the user terminal 100 of FIG. 1, the electronic device 2200 of FIG. 2, the electronic device 3300 of FIG. 3, or the electronic device 1200 of FIG. 12) while connected with the electronic device 1500 via communication. According to an embodiment, the screen 1510 for registering the associated non-speech signal pattern may include a menu, icon, or button (ADD) 1512 for registering a new non-speech signal pattern, information 1514 about pre-registered non-speech signal patterns, or/and a menu, icon or button (+) 1516 for requesting pre-registered non-speech signal pattern detailed information. According to an embodiment, as the menu, icon, or button (ADD) 1512 for registering a new non-speech signal pattern is selected, the external electronic device 1501 may display a new non-speech signal pattern registration screen 1520. According to an embodiment, the new non-speech signal pattern registration screen 1520 may include a command input area 1522 for inputting a command and non-speech signal pattern information (e.g., the non-speech signal pattern model) 1524 received by the electronic device 1500 in response to the command. If the electronic device 1500 connects to the external electronic device 1501 and the user applies a physical input to the plurality of microphones, the electronic device 1500 may transmit the non-speech signal pattern information (e.g., the non-speech signal pattern model) obtained from the non-speech signal received by the physical input to the external electronic device 1501 to be displayed on the new non-speech signal pattern registration screen 1520. If the SAVE button is entered by the user, the command input to the command input area 1522 may be associated with the non-speech signal pattern information received from the electronic device 1500 and be stored in the external electronic device 1501 or/and the electronic device 1500.

Figure 16:
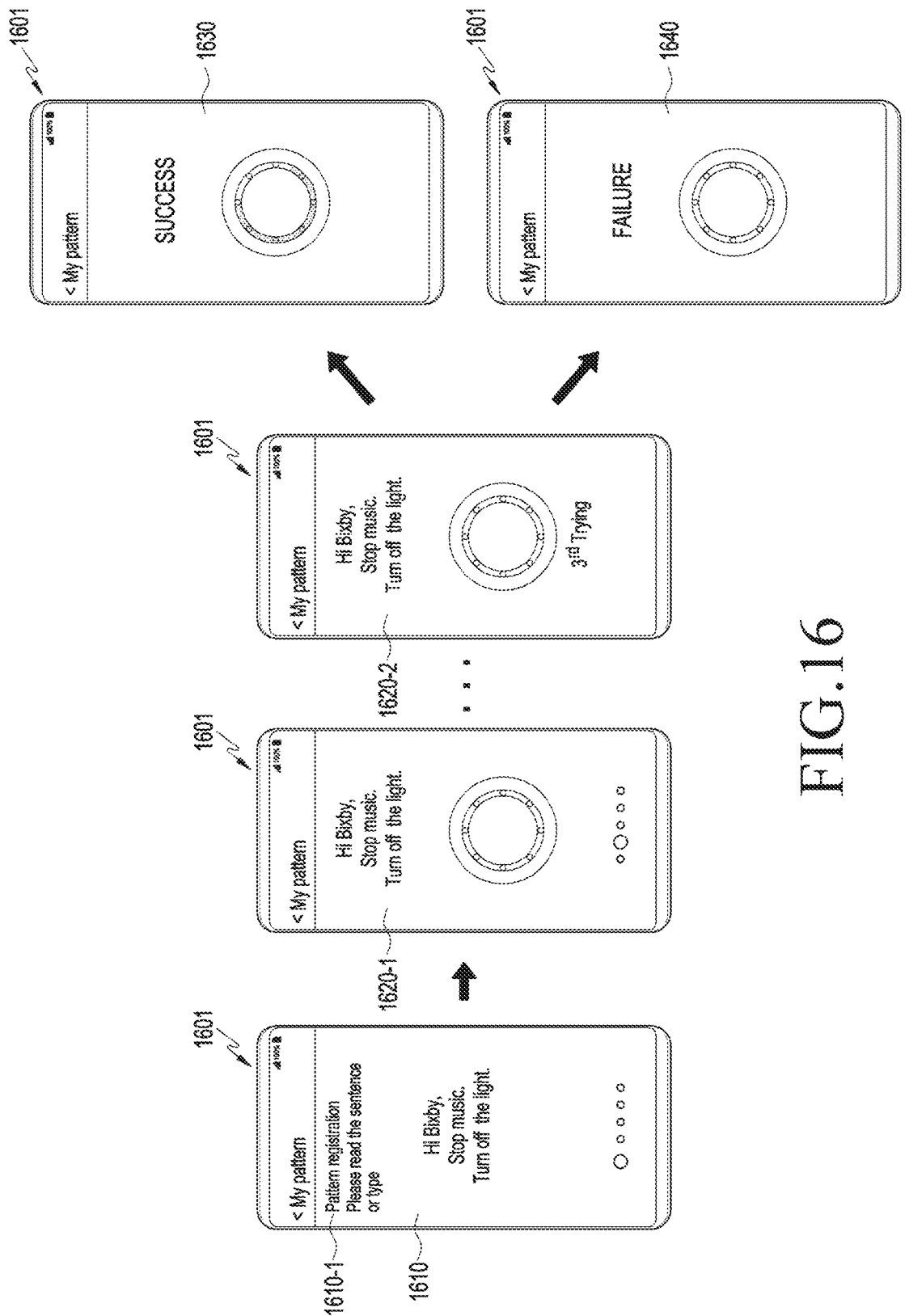
FIG. 16 is views illustrating an example screen of registering a non-speech signal pattern used in an electronic device according to an embodiment of the disclosure.

FIG. 16 is views illustrating an example screen of registering a non-speech signal pattern used in an electronic device according to an embodiment of the disclosure.

Referring to FIG. 16, an external electronic device 1601 (e.g., the external electronic device 1201 of FIG. 12) may display a screen 1610 (e.g., a My pattern screen) and information 1610-1 for registering the non-speech signal pattern associated with the electronic device 1500 (e.g., the user terminal 100 of FIG. 1, the electronic device 2200 of FIG. 2, the electronic device 3300 of FIG. 3, or the electronic device 1200 of FIG. 12) while connected with the electronic device 1500 via communication. The screen 1610 for registering the non-speech signal pattern associated with the electronic device 1500 may include a guidance to allow the command and the new non-speech signal pattern to be registered in the electronic device 1500 and information 1620-1 to 1620-2 about whether the command and new non-speech signal pattern registration proceeds (or how many times it is performed) in the electronic device 1500. If the registration of the new non-speech signal pattern in the electronic device 1500 succeeds, the external electronic device 1601 may display a success screen (e.g., success) 1630 and, if the registration of the new non-speech signal pattern in the electronic device 1500 fails, the external electronic device 1601 may display a failure screen (e.g., failure) 1640. According to an embodiment, other various pieces of information for registering a new non-speech signal pattern than those described above may be provided on the display screen.

Figure 17A:
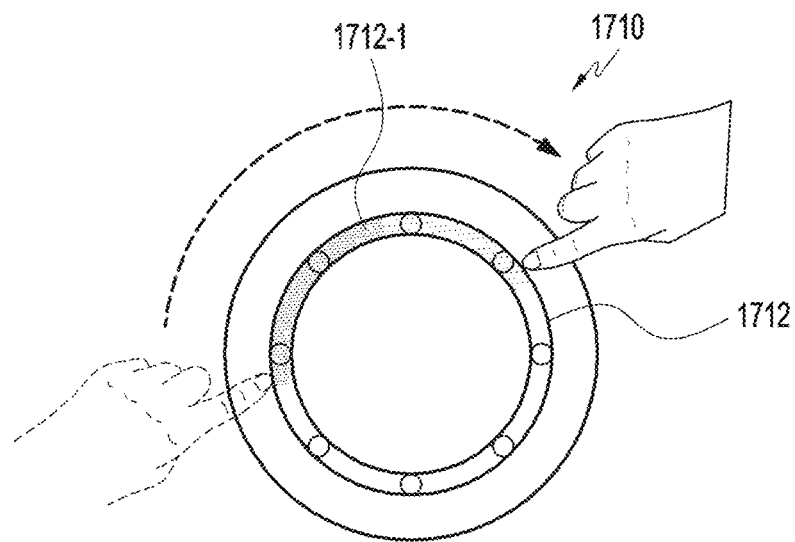
FIGS. 17A and 17B are perspective views illustrating an indication upon registering a non-speech signal pattern in an electronic device according to various embodiments of the disclosure.
Figure 17B:
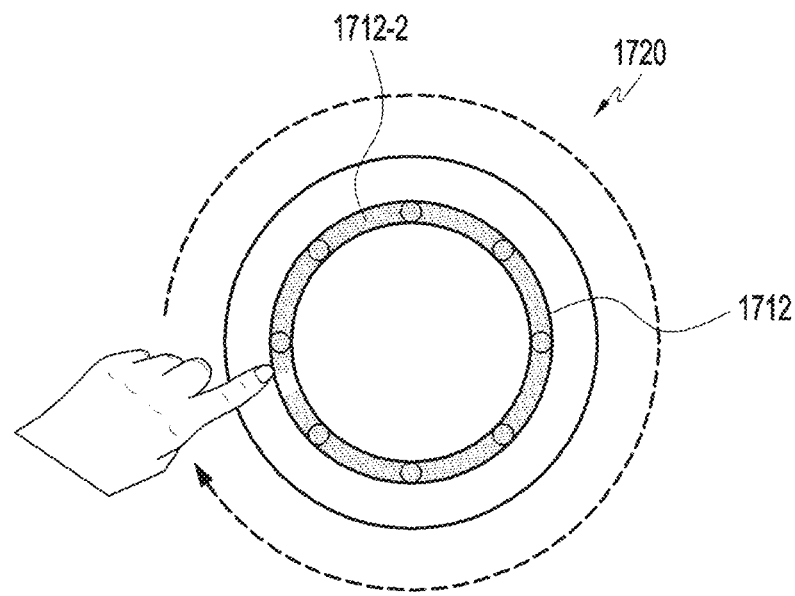

FIGS. 17A and 17B are views illustrating an indication upon registering a non-speech signal pattern in an electronic device according to various embodiments of the disclosure.

Referring to FIG. 17A, according to an embodiment, if the user performs a physical input to microphones or area 1712 (e.g., 215 of FIG. 2) where the microphones are arranged, the electronic device 1500 (e.g., the user terminal 100 of FIG. 1, the electronic device 2200 of FIG. 2, the electronic device 3300 of FIG. 3, or the electronic device 1200 of FIG. 12) may display an indication 1712-1 indicating the pattern of the non-speech audio signal obtained based on the physical input to the area indicating the portion where the plurality of microphones 213 are arranged. For example, if the user draws a semicircle from a first strength to a second strength on the microphones or in the area 1712 (e.g., 215 of FIG. 2) where the microphones are arranged (1710), the electronic device 1500 may display a semicircle 1712-1 whose color changes from a color corresponding to the first strength to a color corresponding to the second strength.

Referring to FIG. 17B, according to an embodiment, if the user draws a circle constantly at a third strength on the microphones or in the area 1712 (e.g., 215 of FIG. 2) where the microphones are arranged (1720), the electronic device 1500 may display a circle 1712-2 in a color corresponding to the third strength.

Each of the aforementioned components of the electronic device may include one or more parts, and a name of the part may vary with a type of the electronic device. The electronic device in accordance with various embodiments of the disclosure may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

According to an embodiment, there is provided a non-transitory storage medium storing instructions, the instructions configured to be executed by at least one circuit to cause the at least one circuit to perform at least one operation comprising performing speech audio processing or non-speech audio processing on audio signals received via a plurality of microphones, obtaining a non-speech audio signal based on the speech audio processing or the non-speech audio processing, identifying a non-speech audio signal pattern corresponding to the non-speech audio signal, obtaining the non-speech audio signal-based first command based on the identified non-speech audio signal pattern, and performing at least one action corresponding to the obtained first command.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, Flash Memories, or the like. Examples of the program instructions may include not only machine language codes but also high-level language codes which are executable by various computing means using an interpreter. The aforementioned hardware devices may be configured to operate as one or more software modules to carry out various embodiments of the disclosure, and vice versa.

Modules or programming modules in accordance with various embodiments of the disclosure may include at least one or more of the aforementioned components, omit some of them, or further include other additional components.

Operations performed by modules, programming modules or other components in accordance with various embodiments of the disclosure may be carried out sequentially, simultaneously, repeatedly, or heuristically. Furthermore, some of the operations may be performed in a different order, or omitted, or include other additional operation(s).

As is apparent from the foregoing description, according to various embodiments, the electronic device may perform functions using the recognition of non-speech audio signals as well as speech audio signals.

According to various embodiments, the electronic device may more precisely recognize non-speech audio signal via separate non-speech audio signal processing to raise the recognition rate of speech audio signals and non-speech audio signals.

According to various embodiment, the electronic device may perform various functions using non-speech audio signals as the user registers non-speech audio signals and meanings (information, data, or commands) corresponding to the non-speech audio signals as the user desires.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a speaker;
a plurality of microphones;
at least one processor operatively connected with the speaker and the plurality of microphones; and
a memory operatively connected with the at least one processor,
wherein the memory is configured to store instructions which, when executed, cause the electronic device to:
perform first pre-processing on audio signals, the first pre-processing includes filtering the audio signals to extract a voice frequency band signal received via the plurality of microphones and amplifying the voice frequency band signal, to obtain a speech audio signal,
perform second pre-processing on the audio signals, the second pre-processing including removing noise or removing echoes caused by an ambient environment from the audio signals received via the plurality of microphones and amplifying a non-speech audio signal pattern, to obtain a non-speech audio signal,
in response to the obtaining of the non-speech audio signal based on the second pre-processing on the audio signals,
identify the non-speech audio signal pattern corresponding to the non-speech audio signal,
obtain a non-speech audio signal-based first command based on the identified non-speech audio signal pattern, and
perform at least one action corresponding to the obtained non-speech audio signal-based first command, and
in response to the obtaining of the speech audio signal based on the first pre-processing,
perform speech recognition on the speech audio signal, and
perform at least one action corresponding to a speech recognition-based second command,
wherein the first pre-processing on the audio signals to obtain the speech audio signal is different from the second pre-processing on the audio signals to obtain the non-speech audio signal, and
wherein the non-speech audio signal is resultant from a physical input on an area indicating a portion where the plurality of microphones are arranged.

2. The electronic device of claim 1, wherein the non-speech audio signal comprises a signal obtained by using the plurality of microphones based on a physical input to at least part of the plurality of microphones or at least part of an area where the plurality of microphones are arranged.

3. The electronic device of claim 1,
wherein the memory is further configured to store a plurality of non-speech audio signal pattern models, and
wherein the instructions are further configured to cause the electronic device to identify the non-speech audio signal pattern corresponding to the non-speech audio signal based on the stored plurality of non-speech audio signal pattern models.

4. The electronic device of claim 3,
wherein the memory is further configured to store a plurality of commands individually corresponding to the stored plurality of non-speech audio signal pattern models, and
wherein the instructions are further configured to cause the electronic device to obtain the non-speech audio signal-based first command corresponding to the identified non-speech audio signal pattern based on the plurality of commands individually corresponding to the stored plurality of non-speech audio signal pattern models.

5. The electronic device of claim 1, wherein the instructions are further configured to cause the electronic device to:
associate a command input by a user with the non-speech audio signal pattern obtained from the audio signals received from the plurality of microphones by a physical input to at least part of the plurality of microphones or at least part of an area where the plurality of microphones are arranged, and
store the command associated with the non-speech audio signal pattern.

6. The electronic device of claim 5, further comprising:
a transceiver,
wherein the instructions are further configured to cause the electronic device to transmit the obtained non-speech audio signal pattern to an external electronic device via the transceiver.

7. The electronic device of claim 6, wherein the instructions are further configured to cause the electronic device to:
associate a command with the obtained non-speech audio signal pattern according to a request from the external electronic device via the transceiver, and
store the command associated with the obtained non-speech audio signal pattern.

8. A controlling method using a non-speech audio signal in an electronic device, comprising:
performing first pre-processing on audio signals, the first pre-processing includes filtering the audio signals to extract a voice frequency band signal received via a plurality of microphones and amplifying the voice frequency band signal, to obtain a speech audio signal;
performing second pre-processing on the audio signals, the second pre-processing including removing noise or removing echoes caused by an ambient environment from the audio signals received via the plurality of microphones and amplifying a non-speech audio signal pattern, to obtain a non-speech audio signal;

in response to the obtaining of the non-speech audio signal based on the second pre-processing on the audio signals,
  identifying the non-speech audio signal pattern corresponding to the non-speech audio signal,
  obtaining a non-speech audio signal-based first command based on the identified non-speech audio signal patterns, and
  performing at least one action corresponding to the obtained non-speech audio signal-based first command; and
in response to the obtaining of the speech audio signal based on the first pre-processing,
  performing speech recognition on the speech audio signal, and
  performing at least one action corresponding to a speech recognition-based second command,
wherein the first pre-processing on the audio signals to obtain the speech audio signal is different from the second pre-processing on the audio signals to obtain the non-speech audio signal, and
wherein the non-speech audio signal is resultant from a physical input on an area indicating a portion where the plurality of microphones are arranged.

9. The controlling method of claim 8, wherein the non-speech audio signal comprises a signal obtained by using the plurality of microphones based on a physical input to at least part of the plurality of microphones or at least part of an area where the plurality of microphones are arranged.

10. The controlling method of claim 8, wherein the non-speech audio signal pattern corresponding to the non-speech audio signal is identified based on a stored plurality of non-speech audio signal pattern models.

11. The controlling method of claim 10, wherein the non-speech audio signal-based first command corresponding to the identified non-speech audio signal pattern is obtained based on the plurality of commands individually corresponding to the stored plurality of non-speech audio signal pattern models.

12. The controlling method of claim 8, further comprising:
  associating a command input by a user with the non-speech audio signal pattern obtained from the audio signals received from the plurality of microphones by a physical input to at least part of the plurality of microphones or at least part of an area where the plurality of microphones are arranged; and
  storing the command associated with the non-speech audio signal pattern.

13. The controlling method of claim 12, further comprising:
  transmitting the obtained non-speech audio signal pattern to an external electronic device via a transceiver;
  associating the command with the obtained non-speech audio signal pattern; and
  storing the command associated with the non-speech audio signal pattern according to a request from the external electronic device.

14. A non-transitory storage medium storing instructions, the instructions configured to be executed by at least one circuit to cause the at least one circuit to perform at least one operation, the at least one operation comprising:
  performing first pre-processing on audio signals, the first pre-processing includes filtering the audio signals to extract a voice frequency band signal received via a plurality of microphones and amplifying the voice frequency band signal, to obtain a speech audio signal;
  performing second pre-processing on the audio signals, the second pre-processing including removing noise or removing echoes caused by an ambient environment from the audio signals received via the plurality of microphones and amplifying a non-speech audio signal pattern, to obtain a non-speech audio signal;
  in response to the obtaining of the non-speech audio signal based on the second pre-processing on the audio signals,
    identifying the non-speech audio signal pattern corresponding to the non-speech audio signal,
    obtaining a non-speech audio signal-based first command based on the identified non-speech audio signal patterns, and
    performing at least one action corresponding to the obtained non-speech audio signal-based first command; and
  in response to the obtaining of the speech audio signal based on the first pre-processing,
    performing speech recognition on the speech audio signal, and
    performing at least one action corresponding to a speech recognition-based second command,
  wherein the first pre-processing on the audio signals to obtain the speech audio signal is different from the second pre-processing on the audio signals to obtain the non-speech audio signal, and
  wherein the non-speech audio signal is resultant from a physical input on an area indicating a portion where the plurality of microphones are arranged.

* * * * *